United States Patent [19]
Yatka et al.

[11] Patent Number: 5,458,892
[45] Date of Patent: Oct. 17, 1995

[54] CHEWING GUM AND OTHER COMESTIBLES CONTAINING INDIGESTIBLE DEXTRIN

[75] Inventors: Robert J. Yatka, Orland Park; Lindell C. Richey, Lake Zurich; Marc A. Meyers, Naperville; Kevin B. Broderick, Berwyn; David W. Record, River Forest, all of Ill.

[73] Assignee: Wm. Wrigley Jr. Company, Chicago, Ill.

[21] Appl. No.: 211,197

[22] PCT Filed: Sep. 25, 1992

[86] PCT No.: PCT/US92/08137

§ 371 Date: Mar. 17, 1994

§ 102(e) Date: Mar. 17, 1994

Related U.S. Application Data

[63] Continuation-in-part of Ser. No. 802,659, Dec. 3, 1991, Pat. No. 5,236,719.

[51] Int. Cl.$^6$ .................................................. A23G 3/30
[52] U.S. Cl. ........................... 426/5; 426/658; 426/3
[58] Field of Search ................................ 426/3–6, 658, 426/804

[56] References Cited

U.S. PATENT DOCUMENTS

| | | |
|---|---|---|
| 3,974,032 | 8/1976 | Harjes et al. . |
| 4,241,091 | 12/1980 | Stroz et al. . |
| 4,518,581 | 5/1985 | Miyake et al. . |
| 4,579,738 | 4/1986 | Cherukuri et al. . |
| 4,581,234 | 4/1986 | Cherukuri et al. . |
| 4,587,125 | 5/1986 | Cherukuri et al. . |
| 4,622,233 | 11/1986 | Torres . |
| 4,671,961 | 6/1987 | Patel et al. . |
| 4,671,967 | 6/1987 | Patel et al. . |
| 4,695,463 | 9/1987 | Yang et al. . |
| 4,711,784 | 12/1987 | Yang . |
| 4,728,515 | 3/1988 | Patel et al. . |
| 4,740,376 | 4/1988 | Yang . |
| 4,803,082 | 2/1989 | Cherukuri et al. . |
| 4,948,596 | 8/1990 | Bunick et al. . |
| 5,120,550 | 6/1992 | Van der Schueren . |
| 5,120,551 | 6/1992 | Yatka et al. . |
| 5,236,719 | 8/1993 | Meyers et al. ............... 426/3 |
| 5,264,568 | 11/1993 | Yamada et al. . |

FOREIGN PATENT DOCUMENTS

| | | |
|---|---|---|
| 0368451 | 5/1990 | European Pat. Off. . |
| 0435656 | 7/1991 | European Pat. Off. . |
| 0477089 | 3/1992 | European Pat. Off. . |
| 0485304 | 5/1992 | European Pat. Off. . |
| 0487187 | 5/1992 | European Pat. Off. . |
| 2-100695 | 4/1990 | Japan . |
| 2-145169 | 6/1990 | Japan . |
| 2-154664 | 6/1990 | Japan . |
| 3-47831 | 7/1991 | Japan . |
| 3-47832 | 7/1991 | Japan . |
| 4-60619 | 9/1992 | Japan . |
| 5-115247 | 5/1993 | Japan . |
| WO92/09208 | 6/1992 | WIPO . |
| WO93/05663 | 4/1993 | WIPO . |

OTHER PUBLICATIONS

Brochure entitled "All About Pine Fibre," published by Matsutani Chemical Industry Co., Ltd., Oct. 1989.
Brochure entitled "Basic Properties of Fibersol-2," published by Matsutani Chemical Industry Co., Ltd., undated.
"Sugars and Sweeteners," edited by Norman Kretchmer and Clarie B. Hollenbeck, published by CRC Press, 1991, pp. 184–195.

*Primary Examiner*—Jeanette Hunter
*Attorney, Agent, or Firm*—Steven P. Shurtz; Willian Brinks Hofer Gilson & Lione

[57] ABSTRACT

Chewing gum products and other comestibles containing indigestible dextrin and methods of making such products are disclosed. In one embodiment, the indigestible dextrin is used in a rolling compound applied to the chewing gum product. In a second embodiment, the indigestible dextrin is used in a coating, such as a hard-shell coating, for a pellet gum. In a third embodiment, indigestible dextrin is used in the center fill of a chewing gum. In a fourth embodiment, aspartame is used to sweeten the gum composition, and indigestible dextrin is provided in an effective amount to stabilize the aspartame such that after eight weeks of storage at 85° F., at least 10% more aspartame remains undecomposed than would have remained if the indigestible dextrin were not included. Indigestible dextrin is also codried with other sweeteners, coevaporated to make syrups and used as an encapsulating agent for high-intensity sweeteners used in gum compositions.

34 Claims, 7 Drawing Sheets

CHEWING GUM AND OTHER COMESTIBLES CONTAINING INDIGESTIBLE DEXTRIN

CROSS REFERENCE TO RELATED APPLICATIONS

The present application is a continuation-in-part of application Ser. No. PCT/US91/07127, filed as a PCT application on Sept. 27, 1991. That application, published as WO 92/09208, is incorporated herein by reference. The present application is also a continuation-of-part of U.S. patent application Ser. No. 07/802,659 filed Dec. 3, 1991, now U.S. Pat. No. 5,236,719, also incorporated herein by reference.

BACKGROUND OF THE INVENTION

The present invention relates to improved compositions of chewing gum and other comestibles. More particularly, the invention relates to improving chewing gum by the use of specific bulking agents in sugar and non-sugar chewing gum products to give improved texture, moisture absorption properties, and improved shelf-life properties, including aspartame stability. The improved chewing gum compositions may also be used in a variety of chewing gum products such as confectionery coated chewing gum products. Many aspects of the invention are also applicable to confectionary products and other comestibles.

In recent years, efforts have been devoted to replace sugar and sugar syrups normally found in chewing gum with Other carbohydrates and non-carbohydrates. Non-sugar or sugar-free chewing gum, which is growing in popularity, uses sugar alcohols or polyols to replace sugar and sugar syrups. The most popular polyols are sorbitol, mannitol, and xylitol. New polyols are being developed using new technology to replace these polyols. New polyols have various unique properties which can improve the taste, texture, and shelf-life properties of chewing gum for consumers.

The non-sugar polyols have the advantage of not contributing to dental caries of consumers, as well as being able to be consumed by diabetics. However, all polyols have the disadvantage of causing gastrointestinal disturbances if consumed in too great of a quantity. Therefore it would be a great advantage to be able to use a carbohydrate or carbohydrate-like food ingredient for chewing gum and other comestibles that would act as a bulking agent, but not contribute to dental caries nor cause gastrointestinal disturbances.

One such bulking agent is indigestible dextrin, varieties of which are sold under the tradename of Fibersol. This bulking agent or bulk sweetener has recently attained GRAS (generally recognized as safe) status from the USFDA. The bulk sweetener is also approved for use in Japan. Although a carbohydrate, indigestible dextrin does not contribute to dental caries, does not cause gastrointestinal disturbances and does not contribute to calories. Thus, this ingredient's use in chewing gum could be a definite improvement.

The manufacture of indigestible dextrin is disclosed in EPO Patent Publication No. 0 368 451, and its method of preparation is disclosed in other related patent publications, including Japanese patent applications Nos. 2100695; 2145169 and 2154664 and EPO Patent Publication No. 0 477 089. Other patent documents that mention indigestible dextrin include EPO Patent Publication No. 0 435 656 and Japanese Patent Publication Nos. 91-047831 and 91-047832.

The use of indigestible dextrin in chewing gum and a variety of low calorie foods and drinks is disclosed in EPO Patent Publication No. 0 487 187.

Additional information is supplied by brochures from Matsutani Chemical Industry Co., Ltd. of Japan, titled "All About Pinefibre" and "Basic Properties of Fibersol 2."

A similar type material, starch hydrolyzate dextrin, is disclosed in U.S. Pat. No. 3,974,032. The product is a low D.E. starch hydrolyzate of improved stability prepared by enzymatic hydrolysis of dextrins.

SUMMARY OF THE INVENTION

Chewing gum products and other comestibles containing indigestible dextrin and methods of making such products have been invented. In one embodiment, the indigestible dextrin is used in a rolling compound applied to the chewing gum product. In a second embodiment, the indigestible dextrin is used in a coating, such as a hard-shell coating, for a pellet gum. In a third embodiment, indigestible dextrin is used in a center fill of a chewing gum product. In a fourth embodiment, aspartame is used to sweeten the gum composition, and indigestible dextrin is provided in an effective amount to stabilize the aspartame such that after eight weeks of storage at 85° F., at least 10% more aspartame remains undecomposed than would have remained if the indigestible dextrin were not included. In another embodiment, indigestible dextrin purified to remove fermentable components is used to make chewing gum and other comestibles. Indigestible dextrin is also used in another embodiment as an encapsulating agent for high intensity sweeteners or flavors used in gum compositions. In yet another embodiment, indigestible dextrin is co-dried from a solution with another sweetener selected from the group consisting of sugar sweeteners, alditol sweeteners and high potency sweeteners and used in a gum composition. In still another embodiment, indigestible dextrin and a plasticizing agent are co-evaporated to form a syrup that is used in a gum composition.

Since indigestible dextrin does not cause gastrointestinal disturbances, and does not significantly contribute to calories, it gives a highly consumer-acceptable chewing gum product. Purified indigestible dextrin, having all fermentable components removed, gives the further benefit of being non-cariogenic, and products using purified indigestible dextrin are thus highly preferred.

DETAILED DESCRIPTION OF THE DRAWINGS AND PREFERRED EMBODIMENTS OF THE INVENTION

Figure 1:
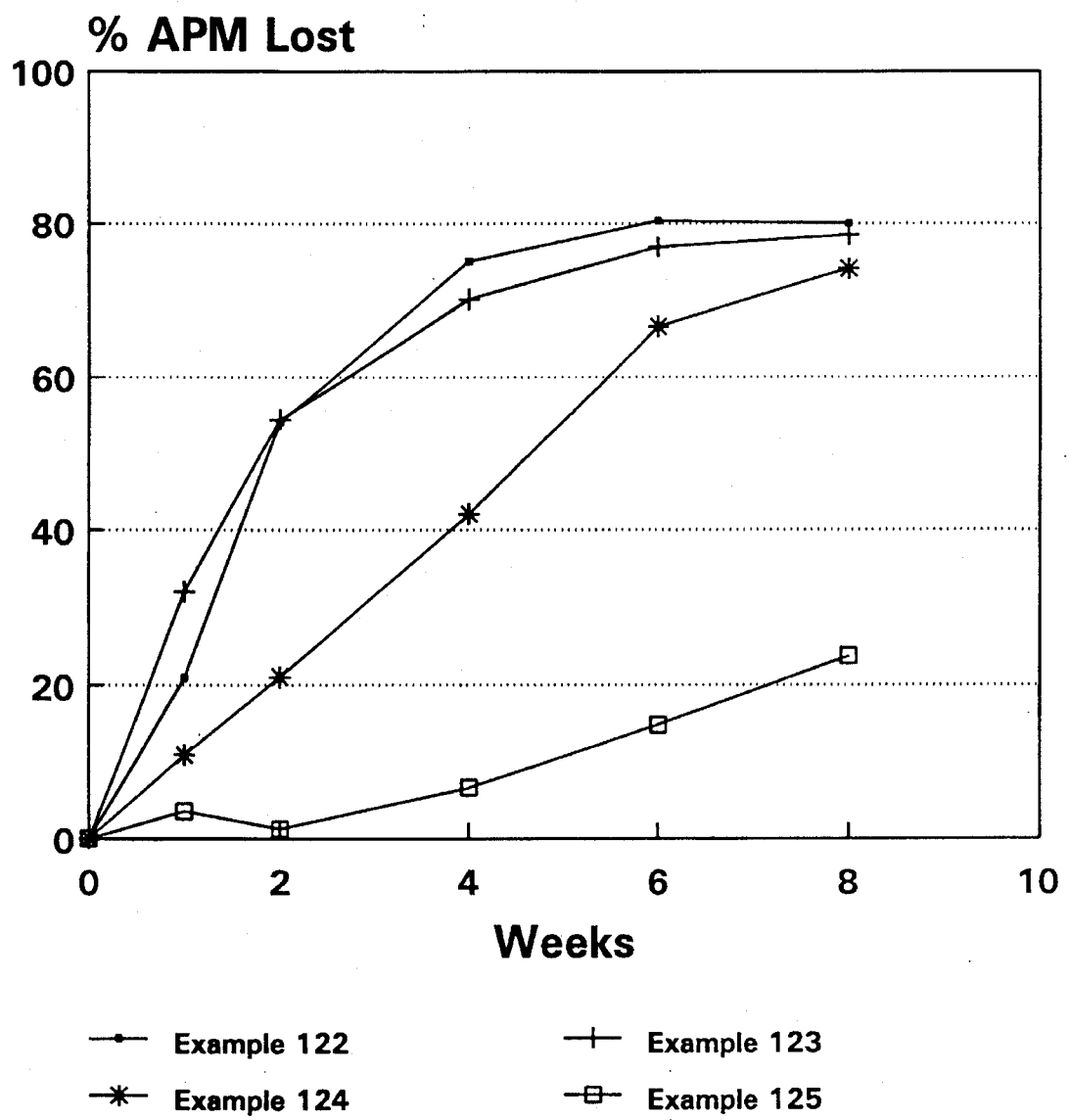
FIG. 1 shows test results of aspartame stability for gum made with indigestible dextrin.

As used herein, the term "chewing gum" also includes bubble gum and the like. Unless otherwise specified, all percentages used herein are weight percents.

Starches are available from a wide variety of grains, but the most common are corn starch or potato starch. Starches are readily hydrolyzed by acid or enzyme to shorter chain carbohydrates composed of glucose units. Completely hydrolyzed starch will yield glucose. Intermediate products are glucose syrups, maltodextrins, dextrins, and modified starch. All starches are composed of mostly α-1,4 linkages between the glucose units, with relatively few α-1,2; α-1,3; and α-1,6 bonds. As starches are hydrolyzed to dextrins, maltodextrins, and glucose syrups, these products continue to have glucose units linked by α-1,4 bonds. Maltodextrins and glucose syrups, having a high level of α-1,4 bonds, are hydrolyzed by salivary alpha amylase to fermentable carbohydrates, which are then converted by bacteria in the mouth to acids, which in turn causes dental caries. Dextrins, however, are made in a unique fashion compared to maltodextrins and glucose syrups. Dextrins are made by hydrolyzing starches in a dry state by the addition of acid and heat (roasting). The roasting process causes glucose obtained by hydrolysis to recombine with the larger carbohydrates to form α-1,2, α-1,3, and α-1,6 bonds. Additional roasting gives highly branched carbohydrates or pyrodextrins.

One supplier has further hydrolyzed the pyrodextrins with enzyme treatments to make a very highly branched product that has properties like a maltodextrin, but is virtually indigestible. This product, called Fibersol or indigestible dextrin, is very water soluble, but has digestion properties like fiber.

There are several types of indigestible dextrin. There is Pinefiber and Pinefiber C, obtained from potato starch, and Fibersol 1 and Fibersol 2, obtained from corn starch. Fibersol 1 (DE=8–12) has a higher molecular weight, while Fibersol 2 (DE=13–18) has a lower molecular weight. Indigestible dextrin is also available as a low density material called Dexflow or Pineflow. All of these materials have similar properties and are referred to herein generically as indigestible dextrin. Any of these forms, as well as purified forms of indigestible dextrin described below, may be used in chewing gum and other comestibles.

Even though Fibersol 2 brand indigestible dextrin is highly branched, it has similar properties to a maltodextrin. As a result, Fibersol 2 has attained GRAS status from the USA Food and Drug Administration as a maltodextrin. Fibersol 1 has been granted GRAS status as a dextrin. In Japan, Fibersol is considered a fat-replacer, low calorie bulking agent. The calorie value of Fibersol is 0.8 Kcal/g, compared to 4.0 Kcal/g for glucose. This indigestible dextrin is being marketed in the U.S. by Fibersol America, a division of Matsutani Chemical Industry Co., Ltd. of Hyogo-Pref., Japan.

Human plaque acidity testing is one of the methods internationally recognized (American Dental Association, Swiss Health Authority) as suitable for evaluating whether a food has the potential to cause cavities. The method is based on the known mechanism of caries development. If no acid (pH>5.7) is produced from the food, then there is no possibility that enamel will erode and eventually develop into a cavity.

The technique used for such plaque acidity testing is to install a miniature pH electrode in a partial denture. The subjects wear the denture for several days in order to allow the normal accumulation of plaque on the electrode. Subjects report to the test laboratory, the electrode is calibrated, and the pH responses to test foods and controls are recorded. If the pH response to a test food does not drop below pH 5.7 during or after eating, the food is accepted as not forming enough acid to cause mineral loss from teeth.

A sample of Fibersol 2 was tested for dental effects by this plaque pH test. Even though it was considered virtually indigestible, the material showed a reduction of plaque pH similar to expected results of maltodextrin, below a pH of 5.7. Analysis of the sample of Fibersol 2 used in the plaque pH test showed that it contained:
96.38% higher saccharide
1.90% maltose
0.53% glucose
0.38% maltosan
0.53% fructose and
0.29% levoglucosan.

The maltose, glucose, and fructose (making up 2.96% of the Fibersol 2) are fermentable, which may have caused the resulting low pH from the plaque pH tests. Further analysis of other samples of Fibersol 2 indicated that Fibersol 2 may contain up to about 10% glucose, fructose and maltose.

Removal of the fermentable components can be done by yeast fermentation, various types of chromatography, including liquid chromatography and gel permeation chromatography, ultrafiltration, and the use of glucose oxidase and maltase enzyme systems.

The yeast fermentation process is one method of eliminating fermentable components from Fibersol 2 or other indigestible dextrins. The process involves the following steps:

1) Prepare a 20% solution of dextrin in water and adjust pH to 4–4.5.
2) Add 0.5% Bakers Yeast (by weight of dextrin) and stir constantly, at 20°–35° C. for 4–16 hours or until all glucose and maltose is gone as analyzed by HPLC.
3) When completed, bring solution to a boil for 5–10 minutes to inactivate yeast.
4) Filter out the insoluble portion.
5) Evaporate, freeze dry or spray dry the filtrate.
6) Optionally, the filtrate may be decolorized by treatment with activated carbon and/or treated through an ion-exchange column to remove degraded protein and to deionize the filtrate.

Applicants requested Matsutani, the supplier of Fibersol 2, to make Fibersol 2 with no dextrose, maltose, or other fermentable sugars. Matsutani has recently produced such a purified material, which Matsutani has designated Fibersol G.

Samples of a Fibersol G powder (which appeared to be spray dried) were sent to the Dental Institute of the University of Zurich, Switzerland, for human plaque acidity testing. In the first 22 minutes of the testing, a stable baseline was obtained by the subject first chewing paraffin from time 0–2 min. The subject then rinsed with 15 ml of 10% aqueous Fibersol G solution for 2 minutes and the pH was monitored for an additional 40 minutes. At minute 64, the subject rinsed with 0.3M sucrose-to validate the test. This control ensures that the system is capable of detecting acid if it were produced by the plaque. At the end of the test session, the subject again chewed paraffin so that the plaque acidity resulting from the sucrose is neutralized.

Results indicated that the plaque pH remained high (above 5.7) during the test procedure, thus indicating that Fibersol G does not contribute to dental caries. Fibersol G is hypoacidogenic and therefore non-cariogenic to a degree comparable to polyols such as sorbitol or mannitol. Even though Fibersol G is considered a maltodextrin, based on these tests its unique non-cariogenic potential allows it to be useful in sugar-free confections such as chewing gum and candies, and in a wide variety of other foods.

Indigestible dextrin may be added to chewing gum and other comestible in its powder form, or may be first dissolved in water. Indigestible dextrin's solubility in water is about 80% at room temperature, but increases with increased temperature like other maltodextrins. Indigestible dextrin may be used in chewing gum as a texture and flavor modifier, bulking agent, and may improve texture, flavor, and shelf life properties. Indigestible dextrin may replace solids like sucrose, dextrose, or lactose when used in its powder form, or may replace syrups when used in its liquid or syrup form. At levels of about 0.5% to about 25%, indigestible dextrin may replace part of the solids in sugar gum or, as a liquid, all or part of the syrup in sugar gum. At higher levels of about 25% to about 90% of the gum formulation, indigestible dextrin may replace all of the solids in a chewing gum formulation.

In its powder or liquid form, a sufficient quantity of indigestible dextrin can also stabilize aspartame. At levels above 10%, indigestible dextrin may replace significant quantities of sucrose and syrup. Because of the resulting lower sweetness, aspartame may be added. It has been found that aspartame is stabilized with indigestible dextrin, especially when the indigestible dextrin is used at a level of 10% or more of the gum. In preferred embodiments, an effective amount of indigestible dextrin is used in gums with sweetness imparting amounts of unencapsulated aspartame to stabilize the aspartame against decomposition during storage at 85° F. for eight weeks whereby at least 10% more aspartame remains undecomposed into non-sweetening derivatives than would have remained undecomposed, if the indigestible dextrin were not included in the gum composition.

Although indigestible dextrin is a carbohydrate, its unique anti-caries properties, especially of Fibersol G, suggest that it may be used in chewing gum formulations containing non-sugar ingredients. Non-sugar ingredients are alditols such as sorbitol, mannitol, xylitol, lactitol, palatinit (Isomalt), maltitol, and hydrogenated starch hydrolyzates. These alditols are used in a variety of combinations to develop unique sugarless chewing gum formulations. Indigestible dextrin may be used to replace the individual alditols or combinations of alditols. With partial replacement of one or more alditols, indigestible dextrin can be used at levels of about 0.5–25%. If indigestible dextrin replaces a large amount or most of the alditols, this level may be about 25% to about 90% of the gum formulation.

Some sugar-free chewing gum formulations contain high levels of glycerin and are very low in moisture, i.e., less than about 2%. Indigestible dextrin solids or syrup may replace part or all of the glycerin used in these types of formulations. At higher moisture levels (more than 2%) in sugar-free gum, a liquid sorbitol (70% sorbitol, 30% water) is used.

When using indigestible dextrin, preferably sorbitol liquid should also be used to obtain soft textured gum formulations. Previous high moisture formulations containing liquid sorbitol were not made with aspartame, since the moisture caused degradation of aspartame. However, when sufficient indigestible dextrin (generally greater than about 10%) is added to a high moisture gum, aspartame is stabilized, and degradation is reduced or eliminated.

Recent advances use HSH and glycerin preblended and co-evaporated to reduce moisture in some sugar-free gum formulations. Indigestible dextrin solids and/or syrup may be used to replace part or all of the HSH/glycerin blends in chewing gum formulations. Aqueous indigestible dextrin solids and/or indigestible dextrin syrup may also replace HSH in the preblend with glycerin and be co-evaporated with glycerin to obtain a low moisture, non-crystallizable blend. Combinations of indigestible dextrin solids/syrup with alditols like sorbitol, maltitol, xylitol, lactitol and mannitol in aqueous form may also be blended with glycerin and coevaporated for use in low-moisture, sugar-free gum.

Indigestible dextrin may be used in gum formulations with hydrogenated starch hydrolysates (HSH) without preblending with glycerin and coevaporation. Low levels of moisture are not necessary to prevent degradation of aspartame when indigestible dextrin is used, so HSH syrups at about 20–30% moisture do not need to be modified to reduce moisture to improve aspartame stability.

Indigestible dextrin bulk sweetener may also be co-dried with a variety of sugars such as sucrose, dextrose, lactose, fructose, and corn syrup solids and used in a sugar-containing gum formulation. Indigestible dextrin may be co-dried with a variety of alditols, such as sorbitol, mannitol, xylitol, maltitol, palatinit and hydrogenated starch hydrolyzates, and used in a sugar-free gum formulation. Co-drying refers to methods of co-crystallization and co-precipitation of indigestible dextrin with sugars and alditols, as well as co-drying by encapsulation, agglomeration, and absorption with sugars and alditols.

Co-drying by encapsulation, agglomeration, and absorption can also include the use of encapsulating and agglomerating agents. Indigestible dextrin may be mixed with sugars or alditols prior to being redried by encapsulation or agglomeration, or may be used alone with the encapsulating and agglomerating agents. These agents modify the physical properties of the bulk sweetener and control its release from chewing gum.

Three methods to obtain a controlled release of bulk sweetener are: (1) encapsulation by spray drying, fluid-bed coating, spray chilling and coacervation to give full or partial encapsulation, (2) agglomeration to give partial encapsulation and (3) fixation or entrapment/absorption which also gives partial encapsulation. These three methods, combined in any usable manner which physically isolates the bulk sweetener, reduces its dissolvability or slows down the release of bulk sweetener, are included in this invention.

Indigestible dextrin may act as an encapsulating or agglomerating agent. Indigestible dextrin may also be used to absorb other ingredients. Indigestible dextrin may be able to encapsulate, agglomerate or entrap/absorb flavors and high-intensity sweeteners like aspartame, alitame, cyclamic acid and its salts, saccharin acid and its salts, acesulfame and its salts, sucralose, dihydrochalcones, thaumatin, monellin or combinations thereof. Encapsulation of high-intensity sweeteners with indigestible dextrin may improve the sweetener's shelf-life.

Indigestible dextrin may be used with other bulk sweeteners and in combination give unique properties. Indigestible dextrin may be co-dried by various delayed release methods noted above with other bulk sweeteners like sucrose, dextrose, lactose, maltose, fructose, corn syrup solids, sorbitol, mannitol, xylitol, maltitol, palatinit and hydrogenated starch hydrolysates for use in sugar and sugar-free chewing gum. Ingredients, including flavors, co-dried, encapsulated, agglomerated or absorbed on indigestible dextrin may show faster release. However, encapsulation of flavors with indigestible dextrin may improve the shelf-life of the flavor ingredient.

Other methods of treating the indigestible dextrin bulk sweetener to physically isolate the sweetener from other chewing gum ingredients may also have some effect on its release rate and its effect on chewing gum flavor and texture. The bulk sweetener may be added to the liquid inside a liquid center gum product. The center fill of a gum product may comprise one or more carbohydrate syrups, glycerin, thickeners, flavors, acidulants, colors, sugars and sugar alcohols in conventional amounts. The ingredients are combined in a conventional manner. The bulk sweetener is dissolved in the center-fill liquid and the amount of bulk sweetener added to the center-fill liquid may be about 0.1% to about 20% by weight of the entire chewing gum formula. This method of using the bulk sweetener in chewing gum can allow for a lower usage level of the bulk sweetener, can give the bulk sweetener a smooth release rate, and can reduce or eliminate any possible reaction of the bulk sweetener with gum base, flavor components or other components, yielding improved shelf stability.

Another method of isolating the indigestible dextrin bulk sweetener from other chewing gum ingredients is to add indigestible dextrin to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after it is wrapped and being stored. The rolling compound comprises indigestible dextrin bulk sweetener alone or in combination with mannitol, sorbitol, sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of indigestible dextrin bulk sweetener added to the rolling compound is about 0.5% to 100% of the rolling compound or about 0.005% to about 5% of the chewing gum composition. This method of using indigestible dextrin bulk sweetener in the chewing gum can allow a lower usage level of the bulk sweetener, can give the bulk sweetener a more controlled release rate, and can reduce or eliminate any possible reaction of the bulk sweetener with gum base, flavor components, or other components, yielding improved shelf stability.

Another method of isolating indigestible dextrin sweetener is to use it in the coating/panning of a pellet chewing gum. Pellet or ball gum is prepared as conventional chewing gum, but formed into pellets that are pillow shaped or into balls. The pellets/balls can then be coated or panned by conventional panning techniques to make a unique coated pellet gum.

Conventional panning procedures generally apply a liquid coating to a pellet, which is then solidified, usually by drying the coating. The coating layer is built up by successive coating and drying steps.

Indigestible dextrin is very stable and highly water soluble, and can be easily added to a sugar solution prepared for sugar panning. Indigestible dextrin may be added in a liquid form to the sucrose coating or any other sugar or alditol coating. Indigestible dextrin can also be added as a powder blended with other powders often used in some types of conventional panning procedures. Using indigestible dextrin sweetener isolates it from other gum ingredients and modifies its release rate in chewing gum. Levels of use of indigestible dextrin may be about 0.1% to about 20% in the coating and about 0.05% to about 10% of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, palatinose, xylitol, lactitol, palatinit and other new alditols or a combination thereof. These materials may be blended with panning modifiers including, but not limited to, gum arabic, maltodextrins, corn syrup, gelatin, cellulose derivatives like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate and talc. Indigestible dextrin may also act as a panning modifier with other panning materials to improve product quality. Antitack agents may also be added as panning modifiers, which allow the use of a variety of carbohydrates and sugar alcohols to be used in the development of new panned or coated gum products. Flavors may also be added with the sugar coating and with the indigestible dextrin bulk sweetener to yield unique product characteristics.

Another method to improve coating processes using sugars or alditols is to add a powder coating after a liquid coating. The powder coating may include indigestible dextrin, maltodextrin, gelatin, cellulose derivatives, starches, modified starches, vegetable gums, and fillers like talc and calcium carbonate. This will reduce stickiness and allow a faster build-up of coating.

Indigestible dextrin may be added to the liquid syrup and used as a panning modifier with other sugar and sugar alcohol syrups such as dextrose, sucrose, xylitol, and palatinit. Indigestible dextrin may act as a binder to, and film former for, the sugar or sugar alcohol coating.

The previously described indigestible dextrin bulk sweetener may readily be incorporated into a chewing gum composition. The remainder of the chewing gum ingredients are noncritical to the present invention. That is, the bulk sweetener can be incorporated into conventional chewing gum formulations in a conventional manner. The indigestible dextrin bulk sweetener may be used in a sugar-free or sugar chewing gum to modify the sweetness thereof. The bulk sweetener may be used in either regular chewing gum or bubble gum. Higher levels of indigestible dextrin will reduce sweetness, thus allowing for its use in nonsweet flavored chewing gums such as snack flavors or savory flavors.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95% by weight of the gum. More preferably the insoluble gum base comprises between 10 and 50 percent by weight of the gum and most preferably about 20 to about 35% by weight of the gum.

The gum base typically also includes a filler component. The filler component may be calcium carbonate, magnesium carbonate, talc, dicalcium phosphate or the like. The filler may constitute between about 5 and about 60% by weight of the gum base. Preferably, the filler comprises about 5 to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. The sweeteners often fill the role of bulking agents in the gum. The bulking agents generally comprise from about 5% to about 90%, preferably from about 20% to about 80%, and most preferably from about 30% to about 60% of the gum.

Softeners are added to the chewing gum in order to optimize the chewability and mouth feel of the gum. Softeners, also known in the art as plasticizers or plasticizing agents, generally constitute between about 0.5 to about 15.0% by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the indigestible dextrin bulk sweetener of the present invention will most likely be used in sugar-free gum formulations. However, sugar formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The indigestible dextrin bulk sweetener of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-stability needed, the indigestible dextrin solid/syrup bulk sweeteners of the present invention can also be used in combination with coated or uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

EXAMPLES

The following examples of the invention and comparative examples are provided by way of explanation and illustration.

The formulas listed in Table 1 comprise various sugar-type formulas in which indigestible dextrin can be added to gum after it is dissolved in water and mixed with various aqueous solvents. Aspartame (APM), which is stabilized with indigestible dextrin, may also be added to the formula. Generally, APM is added to the gum at a level of about 0.005% to about 1% of the gum composition.

TABLE 1

|  | EX. 1 | EX. 2 | EX. 3 | EX. 4 | EX. 5 | EX. 6 | EX. 7 | EX. 8 |
| --- | --- | --- | --- | --- | --- | --- | --- | --- |
| SUGAR | 55.6 | 56.6 | 55.6 | 47.0 | 53.0 | 53.0 | 55.5 | 47.0 |
| BASE | 19.2 | 19.2 | 19.2 | 19.2 | 19.2 | 19.2 | 19.2 | 19.2 |
| CORN SYRUP | 12.8 | 1.8 | 8.8 | 2.8 | 6.8 | 6.8 | 0.0 | 2.8 |
| PEPPERMINT FLAVOR | 0.9 | 0.9 | 0.9 | 0.9 | 0.9 | 0.9 | 0.9 | 0.9 |
| GLYCERIN | 1.4 | 1.4 | 1.4 | 0.0 | 0.0 | 0.0 | 1.4 | 0.0 |
| LIQUID/FIBERSOL 2 BLEND | 10.0 | 20.0 | 14.0 | 30.0 | 20.0 | 20.0 | 22.9 | 30.0 |
| APM | 0.1 | 0.1 | 0.1 | 0.1 | 0.1 | 0.1 | 0.1 | 0.1 |

EXAMPLE 1

Fibersol 2 powder can be added directly to the

EXAMPLE 2

An 80 gram portion of Fibersol 2 can be dissolved in 120 grams of water at 40° C. making a 40% solution and added to gum.

EXAMPLE 3

Fibersol 2 syrup at 70% solids can be added directly to the gum.

EXAMPLE 4

A blend of 80 grams of Fibersol 2 and 120 grams of water is mixed at 40° C. To this is added 100 grams of glycerin to give a mixture of 27% Fibersol 2, 40% water, and 33% glycerin, and added to gum.

EXAMPLE 5

To 140 grams of Fibersol 2 syrup at 70% solids is added 60 grams of glycerin to give a 70% Fibersol 2 syrup with 30% glycerin, and added to gum.

EXAMPLE 6

To 140 grams of Fibersol 2 syrup of 70% solids is added 60 grams of propylene glycol giving a 70% Fibersol 2 syrup with 30% glycerin and added to gum.

EXAMPLE 7

To 140 grams of Fibersol 2 syrup at 70% solids is added 89 grams of corn syrup and blended giving a mixture of 61% Fibersol 2 syrup and 39% corn syrup.

EXAMPLE 8

To a 200 gram quantity of corn syrup is added 100 grams of glycerin. To this mixture is added 75 grams of Fibersol 2 and blended at 50° C. This mixture is added to gum.

In the next examples of sugar gum formulations, indigestible dextrin can be dissolved in water and emulsifiers can be added to the aqueous solution. Example solutions can be prepared by dissolving 15 grams of Fibersol 2 in 70 grams water and adding 15 grams of emulsifiers of various hydrophilic-lipophilic balance (HLB) values to the solution. The mixtures can then be used in the following formulas. (Note: The solution of Example 9 does not contain any emulsifier.)

EXAMPLES 15–20

The same as the formulations made in Examples 9–14, respectively, except that the flavor can be mixed together with the aqueous bulk sweetener solution before adding the mixture to the gum batch.

The following Tables 3 through 10 are examples of gum formulations that demonstrate formula variations in which indigestible dextrin may be used. Formulas with high levels of indigestible dextrin may also contain aspartame (APM) which is stabilized with indigestible dextrin.

Examples 21–25 in Table 3 demonstrates the use of indigestible dextrin in low moisture sugar formulations having less than 2% theoretical moisture:

TABLE 3

|  | EX. 21 | EX. 22 | EX. 23 | EX. 24 | EX. 25 |
| --- | --- | --- | --- | --- | --- |
| SUGAR | 57.9 | 53.9 | 44.9 | 21.0 | 0.0 |
| GUM BASE | 19.2 | 19.2 | 19.2 | 19.2 | 19.2 |
| CORN SYRUP[a] | 6.0 | 6.0 | 6.0 | 6.0 | — |
| DEXTROSE MONOHYDRATE | 10.0 | 10.0 | 10.0 | 10.0 | 10.0 |
| LACTOSE | 0.0 | 0.0 | 0.0 | 5.0 | 5.0 |
| GLYCERIN[b] | 5.0 | 5.0 | 8.9 | 12.7 | 14.6 |
| FLAVOR | 0.9 | 0.9 | 0.9 | 0.9 | 0.9 |
| FIBERSOL 2 | 1.0 | 5.0 | 10.0 | 25.0 | 50.0 |
| APM | — | — | 0.1 | 0.2 | 0.3 |

[a]Corn syrup is evaporated to 85% solids, 15% moisture
[b]Glycerin and syrup may be blended and co-evaporated Examples 26–30 in Table 4 demonstrate the use of indigestible dextrin in medium-moisture sugar formulations having about 2% to about 5% moisture.

TABLE 4

|  | EX. 26 | EX. 27 | EX. 28 | EX. 29 | EX. 30 |
| --- | --- | --- | --- | --- | --- |
| SUGAR | 52.5 | 46.5 | 39.5 | 18.0 | 0.0 |
| GUM BASE | 19.2 | 19.2 | 19.2 | 19.2 | 19.2 |
| CORN SYRUP[a] | 15.0 | 15.0 | 14.9 | 18.3 | 18.2 |
| DEXTROSE MONOHYDRATE | 10.0 | 10.0 | 10.0 | 10.0 | — |
| GLYCERIN[b] | 1.4 | 3.4 | 5.4 | 8.4 | 11.4 |
| FLAVOR | 0.9 | 0.9 | 0.9 | 0.9 | 0.9 |
| FIBERSOL 2 | 1.0 | 5.0 | 10.0 | 25.0 | 50.0 |
| APM | — | — | 0.1 | 0.2 | 0.3 |

[a]Corn syrup is evaporated to 85% solids, 15% moisture
[b]Glycerin and syrup may be blended and co-evaporated

TABLE 2

|  | EX. 9 | EX. 10 | EX. 11 | EX. 12 | EX. 13 | EX. 14 |
| --- | --- | --- | --- | --- | --- | --- |
| SUGAR | 50.7 | 50.7 | 50.7 | 50.7 | 50.7 | 50.7 |
| BASE | 19.2 | 19.2 | 19.2 | 19.2 | 19.2 | 19.2 |
| CORN SYRUP | 12.8 | 12.8 | 12.8 | 12.8 | 12.8 | 12.8 |
| GLYCERIN | 1.4 | 1.4 | 1.4 | 1.4 | 1.4 | 1.4 |
| DEXTROSE MONOHYDRATE | 9.9 | 9.9 | 9.9 | 9.9 | 9.9 | 9.9 |
| APM | 0.1 | 0.1 | 0.1 | 0.1 | 0.1 | 0.1 |
| PEPP. FLAVOR | 0.9 | 0.9 | 0.9 | 0.9 | 0.9 | 0.9 |
| BULK SWEETENER/ EMULSIFIER/WATER MIXTURE | 5.0 | 5.0 | 5.0 | 5.0 | 5.0 | 5.0 |
| EMULSIFIER | None | HLB = 2 | HLB = 4 | HLB = 6 | HLB = 9 | HLB = 12 |

Examples 31–35 in Table 5 demonstrate the use of indigestible dextrin in high-moisture sugar formulations having more than about 5% moisture.

TABLE 5

|  | EX. 31 | EX. 32 | EX. 33 | EX. 34 | EX. 35 |
|---|---|---|---|---|---|
| SUGAR | 50.0 | 44.0 | 36.0 | 15.0 | 0.0 |
| GUM BASE | 24.0 | 24.0 | 24.0 | 24.0 | 24.0 |
| CORN SYRUP | 24.0 | 24.0 | 23.9 | 24.4 | 19.3 |
| GLYCERIN | 0.0 | 2.0 | 5.0 | 10.4 | 5.4 |
| FLAVOR | 1.0 | 1.0 | 1.0 | 1.0 | 1.0 |
| FIBERSOL 2 | 1.0 | 5.0 | 10.0 | 25.0 | 50.0 |
| APM | — | — | 0.1 | 0.2 | 0.3 |

Examples 36–40 in Table 6 and Examples 41–50 in Tables 7 and 8 demonstrate the use of indigestible dextrin in low- and high-moisture gums that are sugarfree. Low-moisture gums have less than about 2% moisture, and high-moisture gums have greater than 2% moisture.

TABLE 6

|  | EX. 36 | EX. 37 | EX. 38 | EX. 39 | EX. 40 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 8.0 |
| GLYCERIN | 10.0 | 10.0 | 9.9 | 9.8 | 14.7 |
| FLAVOR | 1.5 | 1.5 | 1.5 | 1.5 | 1.5 |
| FIBERSOL 2 | 1.0 | 5.0 | 10.0 | 25.0 | 50.0 |
| APM | — | — | 0.1 | 0.2 | 0.3 |

TABLE 7

|  | EX. 41 | EX. 42 | EX. 43 | EX. 44 | EX. 45 |
|---|---|---|---|---|---|
| BASE | 25.5 | 25.5 | 25.5 | 25.5 | 25.5 |
| SORBITOL | 50.0 | 44.0 | 37.0 | 20.0 | 0.0 |
| LIQUID SORBITOL* | 10.0 | 10.0 | 10.0 | 10.0 | 11.0 |
| MANNITOL | 10.0 | 10.0 | 10.0 | 10.0 | 0.0 |
| GLYCERIN | 2.0 | 4.0 | 5.9 | 7.8 | 11.7 |
| FLAVOR | 1.5 | 1.5 | 1.5 | 1.5 | 1.5 |
| FIBERSOL 2 | 1.0 | 5.0 | 10.0 | 25.0 | 50.0 |
| APM | — | — | 0.1 | 0.2 | 0.3 |

*Sorbitol liquid contains 70% sorbitol, 30% water

TABLE 8

|  | EX. 46 | EX. 47 | EX. 48 | EX. 49 | EX. 50 |
|---|---|---|---|---|---|
| BASE | 25.5 | 25.5 | 25.5 | 25.5 | 25.5 |
| SORBITOL | 50.0 | 46.0 | 39.0 | 20.0 | 0.0 |
| HSH SYRUP* | 10.0 | 10.0 | 10.0 | 10.0 | 10.0 |
| MANNITOL | 8.0 | 8.0 | 7.9 | 7.8 | 0.0 |
| GLYCERIN** | 4.0 | 4.0 | 6.0 | 10.0 | 12.7 |
| FLAVOR | 1.5 | 1.5 | 1.5 | 1.5 | 1.5 |
| FIBERSOL 2 | 1.0 | 5.0 | 10.0 | 25.0 | 50.0 |
| APM | — | — | 0.1 | 0.2 | 0.3 |

*Hydrogenated starch hydrolyzate syrup
**Glycerin and HSH syrup may be blended or co-evaporated Table 9 shows sugar chewing formulations that can be made with various other types of sugars.

TABLE 9

|  | EX. 51 | EX. 52 | EX. 53 | EX. 54 | EX. 55 | EX. 56 | EX. 57 | EX. 58 | EX. 59 | EX. 60 | EX. 61 | EX. 62 |
|---|---|---|---|---|---|---|---|---|---|---|---|---|
| GUM BASE | 19.2 | 19.2 | 19.2 | 19.2 | 19.2 | 19.2 | 19.2 | 19.2 | 19.2 | 19.2 | 19.2 | 19.2 |
| SUCROSE | 44.4 | 19.2 | 39.4 | 14.2 | 29.4 | 14.2 | 29.4 | 14.2 | 29.4 | 14.2 | 37.4 | 17.2 |
| GLYCERIN | 1.4 | 6.4 | 1.4 | 6.4 | 1.4 | 6.4 | 1.4 | 6.4 | 1.4 | 6.4 | 1.4 | 6.4 |
| CORN SYRUP | 14.0 | 14.0 | 14.0 | 14.0 | 14.0 | 14.0 | 14.0 | 14.0 | 14.0 | 14.0 | 11.0 | 11.0 |
| DEXTROSE | 5.0 | 5.0 | — | — | 10.0 | 5.0 | 10.0 | 5.0 | 10.0 | 5.0 | 10.0 | 5.0 |
| LACTOSE | 5.0 | 5.0 | 10.0 | 10.0 | — | — | — | — | — | — | — | — |
| FRUCTOSE | 5.0 | 5.0 | 10.0 | 10.0 | 10.0 | 5.0 | 10.0 | 5.0 | 10.0 | 5.0 | 5.0 | 5.0 |
| INVERT SUGAR | — | — | — | — | 10.0 | 10.0 | 10.0 | 10.0 | — | — | 5.0 | 5.0 |
| MALTOSE | — | — | — | — | — | — | — | — | 10.0 | 10.0 | — | — |
| CORN SYRUP SOLIDS | — | — | — | — | — | — | — | — | — | — | 5.0 | 5.0 |
| PEPPERMINT FLAVOR | 0.9 | 0.9 | 0.9 | 0.9 | 0.9 | 0.9 | 0.9 | 0.9 | 0.9 | 0.9 | 0.9 | 0.9 |
| FIBERSOL 2 | 5.0 | 25.0 | 5.0 | 25.0 | 5.0 | 25.0 | 5.0 | 25.0 | 5.0 | 25.0 | 5.0 | 25.0 |
| APM | 0.1 | 0.3 | 0.1 | 0.3 | 0.1 | 0.3 | 0.1 | 0.3 | 0.1 | 0.3 | 0.1 | 0.3 |

Any of the sugars may be combined with indigestible dextrin and co-dried to form unique combinations such as:

EXAMPLE 63

Dextrose and Fibersol 2 can be dissolved in water in a 2:1 ratio dextrose:Fibersol 2 and co-dried or co-precipitated and used in the formulas in Table 9.

EXAMPLE 64

Fibersol 2 and sucrose can be dissolved in water in a 1:1 ratio and co-dried or co-precipitated and used in the formulas in Table 9.

EXAMPLE 65

Fibersol 2, sucrose and dextrose can be dissolved in water in a 1:1:1 ratio and co-dried or coprecipitated and used in the formulas in Table 9.

EXAMPLE 66

Fibersol 2, sucrose, dextrose and fructose can be dissolved in water at 25% of each ingredient and co-dried, and used in the formulas in Table 9.

EXAMPLE 67

Fibersol 2, dextrose, fructose and lactose can be dissolved in water at 25% of each ingredient and co-dried, and used in the formulas in Table 9.

EXAMPLE 68

Fibersol 2, dextrose, maltose and corn syrup solids can be dissolved in water at 25% of each ingredient and co-dried, and used in the formulas in Table 9.

EXAMPLE 69

Fibersol 2, sucrose, dextrose, maltose and fructose can be dissolved in water at 20% of each ingredient and co-dried, and used in the formulas in Table 9.

Multiple combinations of indigestible dextrin with other sugars can be made in solution to form liquid concentrates that do not need to be co-dried, such as:

EXAMPLE 70

Fibersol 2, corn syrup and glycerin can be dissolved in water at a ratio of 1:1:1, evaporated to a thick syrup and used in the formulas in Table 9.

EXAMPLE 71

Fibersol 2, dextrose, fructose and invert syrup may be dissolved in water at 25% of each ingredient and evaporated to a thick syrup and used in the formulas in Table 9.

EXAMPLE 72

Fibersol 2, dextrose, maltose and corn syrup solids may be dissolved in water at 25 % of each component and evaporated to a thick syrup and used in the formulas in Table 9.

EXAMPLE 73

Glycerin is added to Example 71 at a ratio of 4:1 syrup to glycerin and evaporated to a thick syrup, and used in the formulas in Table 9.

EXAMPLE 74

Glycerin is added to Example 72 at a ratio of 2:1 syrup to glycerin and evaporated to a thick syrup, and used in the formulas in Table 9.

Table 10 shows chewing gum formulations that are free of sugar. These formulations can use a wide variety of other non-sugar alditols, including Lycasin brand HSH syrup.

TABLE 10

|  | EX. 75 | EX. 76 | EX. 77 | EX. 78 | EX. 79 | EX. 80 |
|---|---|---|---|---|---|---|
| GUM BASE | 25.5 | 25.5 | 25.5 | 25.5 | 25.5 | 25.5 |
| GLYCERIN | 1.9 | 5.7 | 1.9 | 5.7 | 4.9 | 7.7 |
| SORBITOL | 44.0 | 10.0 | 34.0 | 5.0 | 25.0 | — |
| MANNITOL | — | 10.0 | 10.0 | 10.0 | 10.0 | — |
| SORBITOL LIQUID | 17.0 | 17.0 | — | — | — | — |
| LYCASIN | — | — | 17.0 | 12.0 | 8.0 | 10.0 |
| MALTITOL | — | — | — | 10.0 | — | — |
| XYLITOL | — | — | — | — | 15.0 | 15.0 |
| LACTITOL | — | — | — | — | — | — |
| PALATINIT | — | — | — | — | — | — |
| FLAVOR | 1.5 | 1.5 | 1.5 | 1.5 | 1.5 | 1.5 |
| FIBERSOL 2 | 10.0 | 30.0 | 10.0 | 30.0 | 10.0 | 40.0 |
| APM | 0.1 | 0.3 | 0.1 | 0.3 | 0.1 | 0.3 |

|  | EX. 81 | EX. 82 | EX. 83 | EX. 84 | EX. 85 | EX. 86 |
|---|---|---|---|---|---|---|
| GUM BASE | 25.5 | 25.5 | 25.5 | 25.5 | 25.5 | 25.5 |
| GLYCERIN | 7.9 | 10.7 | 7.9 | 9.7 | 6.7 | 7.7 |
| SORBITOL | 32.0 | 4.0 | 22.0 | 3.0 | 6.0 | — |
| MANNITOL | 8.0 | 8.0 | 8.0 | — | — | — |
| SORBITOL LIQUID | 5.0 | — | — | — | — | — |
| LYCASIN | — | 5.0 | 5.0 | 5.0 | 10.0 | 10.0 |
| MALTITOL | — | 5.0 | — | — | — | — |
| XYLITOL | — | — | — | 15.0 | — | — |
| LACTITOL | 10.0 | 10.0 | 10.0 | — | — | — |
| PALATINIT | — | — | 10.0 | 10.0 | 25.0 | 15.0 |
| FLAVOR | 1.5 | 1.5 | 1.5 | 1.5 | 1.5 | 1.5 |
| FIBERSOL 2 | 10.0 | 30.0 | 10.0 | 30.0 | 25.0 | 40.0 |
| APM | 0.1 | 0.3 | 0.1 | 0.3 | 0.3 | 0.3 |

Any of the alditols can be combined with indigestible dextrin and co-dried to form unique combinations, such as:

EXAMPLE 87

Fibersol 2 and sorbitol can be dissolved in water in a ratio of 2:1 sorbitol:Fibersol 2 and co-dried and used in formulas in Table 10.

EXAMPLE 88

Fibersol 2, sorbitol and mannitol can be dissolved in water at a ratio of 1:1:1, co-dried, and used in appropriate formulas in Table 10.

EXAMPLE 89

Fibersol 2, mannitol and xylitol can be dissolved in water at a ratio of 1:1:1, co-dried, and used in appropriate formulas in Table 10.

EXAMPLE 90

Fibersol 2, sorbitol and lactitol can be dissolved in water at a ratio of 1:1:1, co-dried, and used in appropriate formulas in Table 10.

EXAMPLE 91

Fibersol 2, palatinit and sorbitol can be dissolved in water at a ratio of 1:1:1, co-dried, and used in appropriate formulas in Table 10.

EXAMPLE 92

Fibersol 2 and palatinit can be dissolved in water at a ratio of 1:1, co-dried, and used in appropriate formulas in Table 10.

EXAMPLE 93

Fibersol 2, sorbitol, maltitol and xylitol may be blended at 25% of each ingredient and dissolved in water, co-dried, and used in appropriate formulas in Table 10.

Multiple combinations of indigestible dextrin with the various alditols can be made in solution to form liquid concentrates that do not need to be co-dried, such as:

EXAMPLE 94

Fibersol 2, sorbitol, maltitol and Lycasin may be dissolved in water at 25% of each ingredient, evaporated to a thick syrup and used in the appropriate formulas in Table 10.

EXAMPLE 95

Fibersol 2, xylitol, sorbitol and Lycasin can be dissolved in water at 25% of each ingredient, evaporated to a thick syrup, and used in the formulas in Table 10.

EXAMPLE 96

Fibersol 2, sorbitol, lactitol and Lycasin can be dissolved in water at 25% of each ingredient, evaporated to a thick syrup, and used in the formulas in Table 10.

EXAMPLE 97

Fibersol 2, Lycasin and glycerin can be dissolved in water at a ratio of 1:1:1, evaporated to a thick syrup and used in the formulas in Table 10.

EXAMPLE 98

Glycerin is added to Example 94 at a ratio of 4:1 syrup to glycerin, evaporated to a thick syrup, and used in formulas in Table 10.

EXAMPLE 99

Glycerin is added to Example 95 at a ratio of 4:1 syrup to glycerin, evaporated to a thick syrup, and used in the formulas in Table 10.

EXAMPLE 100

Glycerin is added to Example 96 at a ratio of 4:1 syrup to glycerin, evaporated to a thick syrup, and used in formulas in Table 10.

Other high-intensity sweeteners such as acesulfame K, or the salts of acesulfame, cyclamate and its salts, saccharin and its salts, alitame, sucralose, thaumatin, monellin, dihydrochalcone, stevioside, glycyrrhizin, and combinations thereof may be used in any of the Examples listed in Tables 3, 4, 5, 6, 7, 8 9 and 10. Since indigestible dextrin has less sweetness than some of the sugars used in sugar gum, and some of the alditols in sugar-free gum, a highintensity sweetener may be needed to obtain the proper level of sweetness.

High-intensity sweeteners may also be modified to control their release in chewing gum formulations containing indigestible dextrin. This can be controlled by various methods of encapsulation, agglomeration, absorption, or a combination of methods to obtain either a fast or slow release of the sweetener. Sweetener combinations, some of which may be synergistic, may also be included in the gum formulations containing indigestible dextrin. Indigestible dextrin may also be used to encapsulate, agglomerate, absorb, or entrap any high intensity sweetener to control its release.

The following examples show the use of highintensity sweeteners in chewing gum formulations with indigestible dextrin.

EXAMPLE 101

Alitame at a level of 0.03% may be added to any of the formulas in Tables 3 through 10 by replacing 0.03% of the Fibersol 2.

EXAMPLE 102

Sucralose at a level of 0.07% may be added to any of the formulas in Tables 3 through 10 by replacing 0.07% of the Fibersol 2.

EXAMPLE 103

Thaumatin at a level of 0.02% may be added to any of the formulas in Tables 3 through 10 by replacing 0.02% of the Fibersol 2.

EXAMPLE 104

Glycyrrhizin at a level of 0.4% may be added to any of the formulas in Tables 3 through 10 by replacing 0.4% of the Fibersol 2.

High-intensity sweeteners may also be combined with other high-intensity sweeteners, with or without encapsulation, agglomeration or absorption, and used in chewing gum. Examples are:

EXAMPLE 105

Aspartame and acesulfame K at a 1:1 ratio may be added to any of the formulas in Tables 3 through 10 at a level of 0.15% by replacing 0.15% of the Fibersol 2.

EXAMPLE 106

Aspartame and alitame at a ratio of 9:1 aspartame: alitame may be added to any of the formulas in Tables 3 through 10 at a level of 0.1% by replacing 0.1% of the Fibersol 2.

EXAMPLE 107

Aspartame and thaumatin at a ratio of 9:1 aspartame:thaumatin can be added to any of the formulas in Tables 3 through 10 at a level of 0.1% by replacing 0.1% of the Fibersol 2.

EXAMPLE 108

Sucralose and alitame in a ratio of 3:1 sucralose: alitame can be added to any of the formulas in Tables 3 through 10 at a level of 0.5% by replacing 0.5% of the Fibersol 2.

EXAMPLE 109

Alitame and glycyrrhizin in a ratio of 1:12 alitame:glycyrrhizin can be added to any of the formulas in Tables 3 through 10 at a level of 0.1% by replacing 0.1% of the Fibersol 2.

EXAMPLE 110

Aspartame and glycyrrhizin in a ratio of 1:14 aspartame:glycyrrhizin can be added to any of the formulas in Tables 3 through 10 at a level of 0.3% by replacing 0.3% of the Fibersol 2.

As discussed above, the various types of indigestible dextrin ingredients that are available are Fibersol 1, Fibersol 2, Fibersol G, Dexflow, Pinefiber, Pineflow and Pinefiber C. All of these materials are considered indigestible dextrins. These materials may be used exclusively in a variety of chewing gum formulations, as in Tables 11 and 12. These formulas with indigestible dextrin and APM will show improved APM stability.

TABLE 11

|  | EX. 111 | EX. 112 | EX. 113 | EX. 114 | EX. 115 |
| --- | --- | --- | --- | --- | --- |
| GUM BASE | 19.2 | 25.5 | 25.5 | 25.5 | 40.0 |
| GLYCERIN | 10.0 | 10.0 | 7.0 | 12.0 | 7.0 |
| FIBERSOL 2 | 57.8 | 46.0 | 41.0 | 51.0 | 35.5 |

TABLE 11-continued

|  | EX. 111 | EX. 112 | EX. 113 | EX. 114 | EX. 115 |
|---|---|---|---|---|---|
| POWDER |  |  |  |  |  |
| FIBERSOL |  |  |  |  |  |
| SYRUP* | 12.0 | 17.0 | 25.0 | 10.0 | 15.0 |
| FLAVOR | 1.0 | 1.5 | 1.5 | 1.5 | 2.5 |

*Fibersol syrup at 75% solids may be preblended with glycerin and co-evaporated to reduce moisture.

TABLE 12

|  | EX. 116 | EX. 117 | EX. 118 | EX. 119 | EX. 120 | EX. 121 |
|---|---|---|---|---|---|---|
| GUM BASE | 25.5 | 25.5 | 25.5 | 25.5 | 50.0 | 70.0 |
| GLYCERIN | 10.0 | 12.0 | 7.0 | 15.0 | 7.0 | 4.0 |
| FIBERSOL 2 POWDER | 51.0 | 61.0 | 46.0 | 48.0 | 35.5 | 20.0 |
| FIBERSOL SYRUP* | 12.0 | — | 20.0 | 10.0 | 5.0 | 3.0 |
| FLAVOR | 1.5 | 1.5 | 1.5 | 1.5 | 2.5 | 3.0 |

*Fibersol syrup at 75% solids may be preblended with glycerin and co-evaporated to reduce moisture.

The formulation in Table 11 and 12 do not contain other sugars or alditols. These formulations will give unique texture and flavor attributes. These formulations may also contain other high-intensity, artificial sweeteners, from about 0.02% to about 0.1% for sweeteners like alitame, thaumatin, and dihydrochalcone, and from about 0.1% to about 0.3% for sweeteners like sucralose, acesulfame, and saccharin. The formulations in Tables 11 and 12 without the other types of sugars and alditols will also have good noncariogenic properties.

EXAMPLES 122–125

The following gum formulations were made:

|  | EX. 122 | EX. 123 | EX. 124 | EX. 125 |
|---|---|---|---|---|
| BASE | 27.0 | 27.0 | 27.0 | 27.0 |
| SORBITOL | 40.2 | 38.7 | 32.5 | 20.9 |
| MANNITOL | 12.0 | 11.5 | 9.7 | 6.3 |
| GLYCERIN | 8.1 | 8.1 | 8.1 | 8.1 |
| SORBITOL LIQUID | 11.0 | 11.0 | 11.0 | 11.0 |
| PEPPERMINT FLAVOR | 1.3 | 1.3 | 1.3 | 1.3 |
| COLOR | 0.1 | 0.1 | 0.1 | 0.1 |
| APM | 0.3 | 0.3 | 0.3 | 0.3 |
| FIBERSOL 2 | 0 | 2.0 | 10.0 | 25.0 |

These formulas were made in a conventional lab mixer in a conventional manner on a lab scale and formed into square pellets. Samples of each formula were placed in six sealed pouches and stored at 85° F. for 0, 1, 2, 4, 6 and 8 weeks. Samples were then removed and analyzed for APM to determine degradation. The test results are shown in FIG. 1. As shown, after eight weeks of storage at 85° F., at levels of 10% or greater, there was a significant increase in the stability of APM. Even at 2% indigestible dextrin (Example 123), there was almost a 10% increase in the amount of APM remaining after eight weeks of storage compared to the sample with no indigestible dextrin (Example 122).

EXAMPLES 126–133

The following gum formulations were made:

|  | EX. 126 | EX. 127 | EX. 128 | EX. 129 | EX. 130 | EX. 131 | EX. 132 | EX. 133 |
|---|---|---|---|---|---|---|---|---|
| BASE | 24.7 | 24.7 | 24.7 | 24.7 | 24.7 | 24.7 | 24.7 | 24.7 |
| SORBITOL | 50.0 | 50.0 | 45.0 | 35.0 | 10.0 | 35.0 | 10.0 | 35.0 |
| MANNITOL | 9.4 | 7.0 | 9.4 | 9.4 | 9.4 | 7.0 | 7.0 | 9.0 |
| GLYCERIN | 2.0 | 2.0 | 2.0 | 2.0 | 2.0 | 2.0 | 2.0 | 2.0 |
| LECITHIN | 0.2 | 0.2 | 0.2 | 0.2 | 0.2 | 0.2 | 0.2 | 0.2 |
| PEPPERMINT FLAVOR | 1.4 | 1.4 | 1.4 | 1.4 | 1.4 | 1.4 | 1.4 | 1.4 |
| APM | 0.3 | 0.3 | 0.3 | 0.3 | 0.3 | 0.3 | 0.3 | 0.3 |
| LYCASIN | — | 14.4 | — | — | — | 14.4 | 14.4 | — |
| LIQUID SORBITOL | 12.0 | — | 12.0 | 12.0 | 12.0 | — | — | — |
| FIBERSOL 2 | — | — | 5.0 | 15.0 | 40.0 | 15.0 | 40.0 | 15.0 |
| FIBERSOL SYRUP (78% solids) | — | — | — | — | — | — | — | 12.4 |

Figure 2:
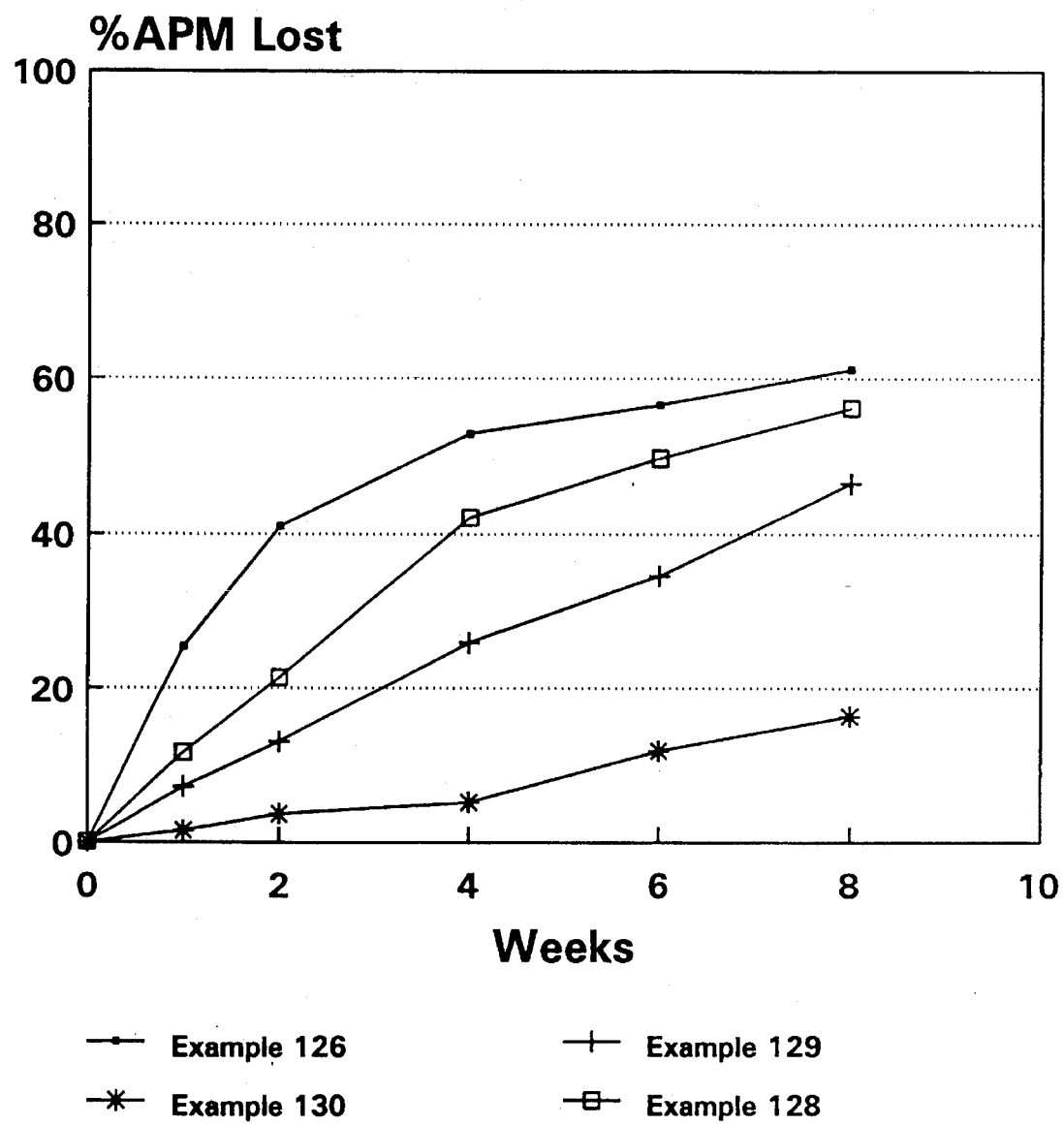
FIG. 2 shows test results of aspartame stability for gum made with sorbitol liquid and indigestible dextrin.
Figure 3:
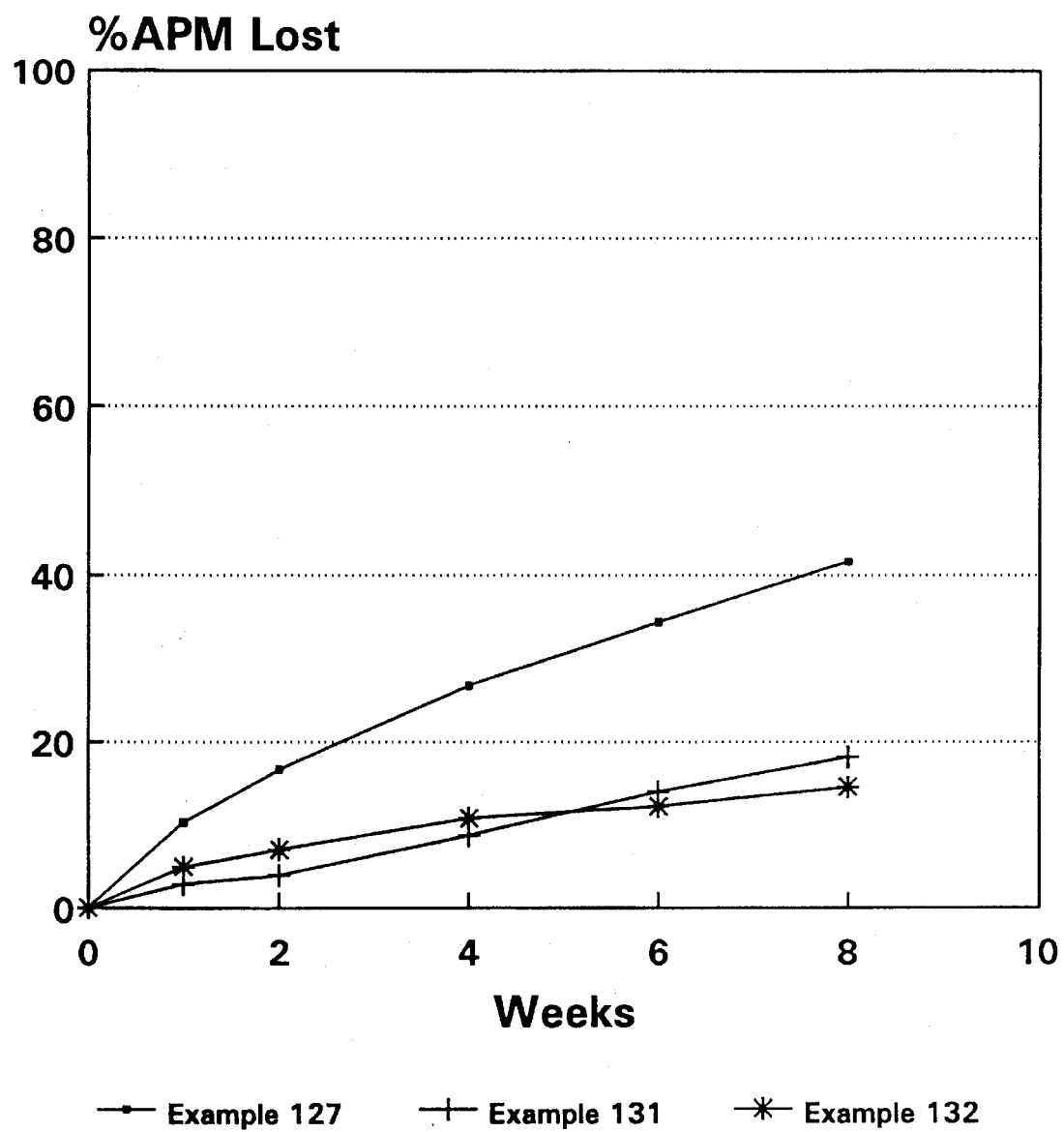
FIG. 3 shows test results of aspartame stability for gum made with HSH syrup and indigestible dextrin.

These formulas were made in a conventional lab mixer in a conventional manner and formed into square pellets. Samples of each formula were placed in four sealed pouches and stored at 85° F. for 0, 1, 2, 4, 6 and 8 weeks. Samples were then removed and analyzed for APM to determine degradation. Results are shown in FIGS. 2 and 3 for gum made with sorbitol liquid and Lycasin brand syrup, respectively. Results show that in both types of formulations, Fibersol 2 improves APM stability significantly as compared to when an indigestible dextrin is not used. As seen in both FIGS. 2 and 3, after eight weeks of storage at 85° F., there was more than a 10% increase in the undecomposed aspartame in the gum formulas that included indigestible dextrin. Also, Examples 130, 131 and 132 produced a gum composition in which the indigestible dextrin was effective such that after eight weeks of storage, over 80% of the unencapsulated aspartame originally formulated in the gum compositions remained undecomposed.

EXAMPLE 134

The following sugar gum center formulation was made:

|  | % |
|---|---|
| Base | 24.8 |
| Sugar | 52.0 |
| Corn Syrup | 22.4 |
| Peppermint Flavor | 0.8 |
|  | 100.0 |

This formulation was made in a 25 gallon standard gum mixer and sheeted as rectangular pellets for coating tests.

Two sugar solutions were prepared for use in coating tests. They are:

| A) | 750 grams sugar | B) | 650 grams sugar |
|---|---|---|---|
|  | 250 grams water |  | 350 grams water |
|  | 30 grams Fibersol 2 |  |  |

In a 12 inch lab size coating pan, 1,000 grams of the above centers were coated with Solution A up to a level of 20% coating, then coating continued with Solution B until a 33% coating was achieved. As coating progressed, ten pieces were weighed to determine the coating weight increase to 20%, then 33%. During the coating process, Solution A was less tacky than other types of coatings which contain gum arabic, maltodextrins or modified starches, but it is anticipated that Fibersol 2 will give good shelf life protection.

The final coated product had a hard, crunchy shell that was slightly tan due to the brown color of Fibersol 2. The flavor had a creamy character, comparable to typical sugar coated pellet gum.

EXAMPLES 135–142

The following low moisture gum formulations were made with various levels of indigestible dextrin:

|  | Ex 135 | Ex 136 | Ex 137 | Ex 138 |
|---|---|---|---|---|
| BASE | 24.7 | 24.7 | 24.7 | 24.7 |
| SORBITOL | 48.9 | 44.6 | 31.8 | 6.0 |
| MANNITOL | 8.1 | 7.4 | 5.2 | 1.0 |
| GLYCERIN | 16.4 | 16.4 | 16.4 | 16.4 |
| LECITHIN | 0.2 | 0.2 | 0.2 | 0.2 |
| PEPPERMINT FLAVOR | 1.4 | 1.4 | 1.4 | 1.4 |
| APM | 0.25 | 0.25 | 0.25 | 0.25 |
| COLOR | 0.05 | 0.05 | 0.05 | 0.05 |
| FIBERSOL 2 | — | 5.0 | 20.0 | 50.0 |

The following high moisture gum formulations were made with various levels of indigestible dextrins:

|  | Ex 139 | Ex 140 | Ex 141 | Ex 142 |
|---|---|---|---|---|
| BASE | 27.0 | 27.0 | 27.0 | 27.0 |
| SORBITOL | 40.5 | 36.6 | 25.1 | 1.9 |
| MANNITOL | 12.0 | 10.9 | 7.4 | 0.6 |
| GLYCERIN | 8.1 | 8.1 | 8.1 | 8.1 |
| LIQUID SORBITOL | 11.0 | 11.0 | 11.0 | 11.0 |
| PEPPERMINT FLAVOR | 1.3 | 1.3 | 1.3 | 1.3 |

-continued

|  | Ex 139 | Ex 140 | Ex 141 | Ex 142 |
|---|---|---|---|---|
| COLOR | 0.1 | 0.1 | 0.1 | 0.1 |
| FIBERSOL 2 | — | 5.0 | 20.0 | 50.0 |

All of the above examples 135–142 were sheeted as stick gum for testing purposes. Sticks were then stored in environmental conditions of 74° F. and 30% RH and removed after 0, 3, 7, 14, and 28 days. At these time intervals, sticks were measured for their Taber stiffness and flexibility. Example 142 at each of days 0, 3, 7, 14 and 28, and Example 138 at 28 days, were too soft to obtain measurable Taber stiffness and flexibility data.

The Taber stiffness value is a measure of the chewing gum's resistance to bending. The higher the Taber stiffness value, the greater the chewing gums toughness. The Taber stiffness values shown in FIGS. 4 and 6 were measured by the Taber V-5 Stiffness Tester, Model 150B, available from Taber Instrument Corp., North Tonawanda, N.Y. The flexibility data shown in FIGS. 5 and 7 were measured by counting the number of times the gum may bend back and forth before breaking.

Figure 4:
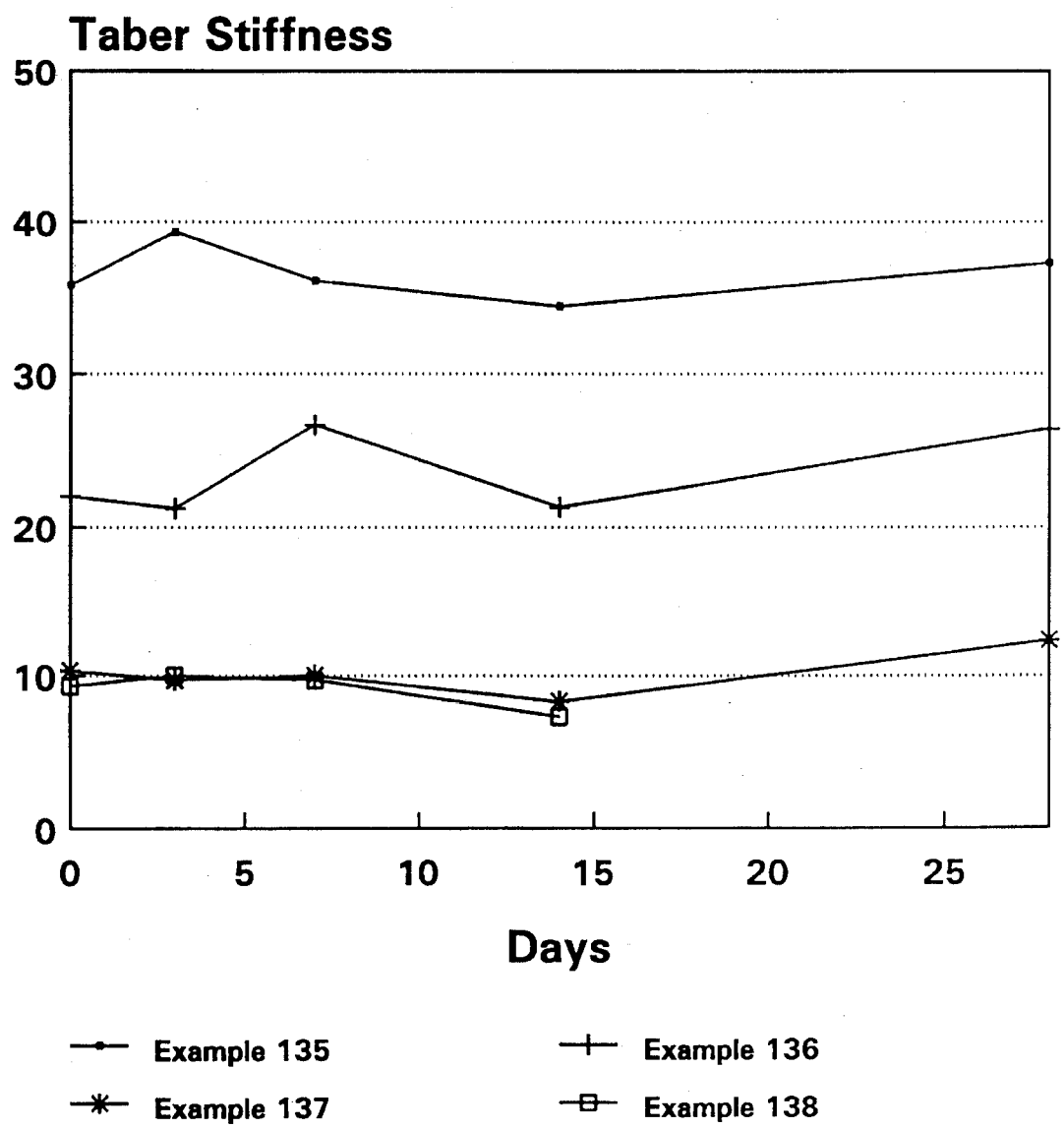
FIG. 4 shows the Taber stiffness of low moisture gum containing indigestible dextrin.
Figure 5:
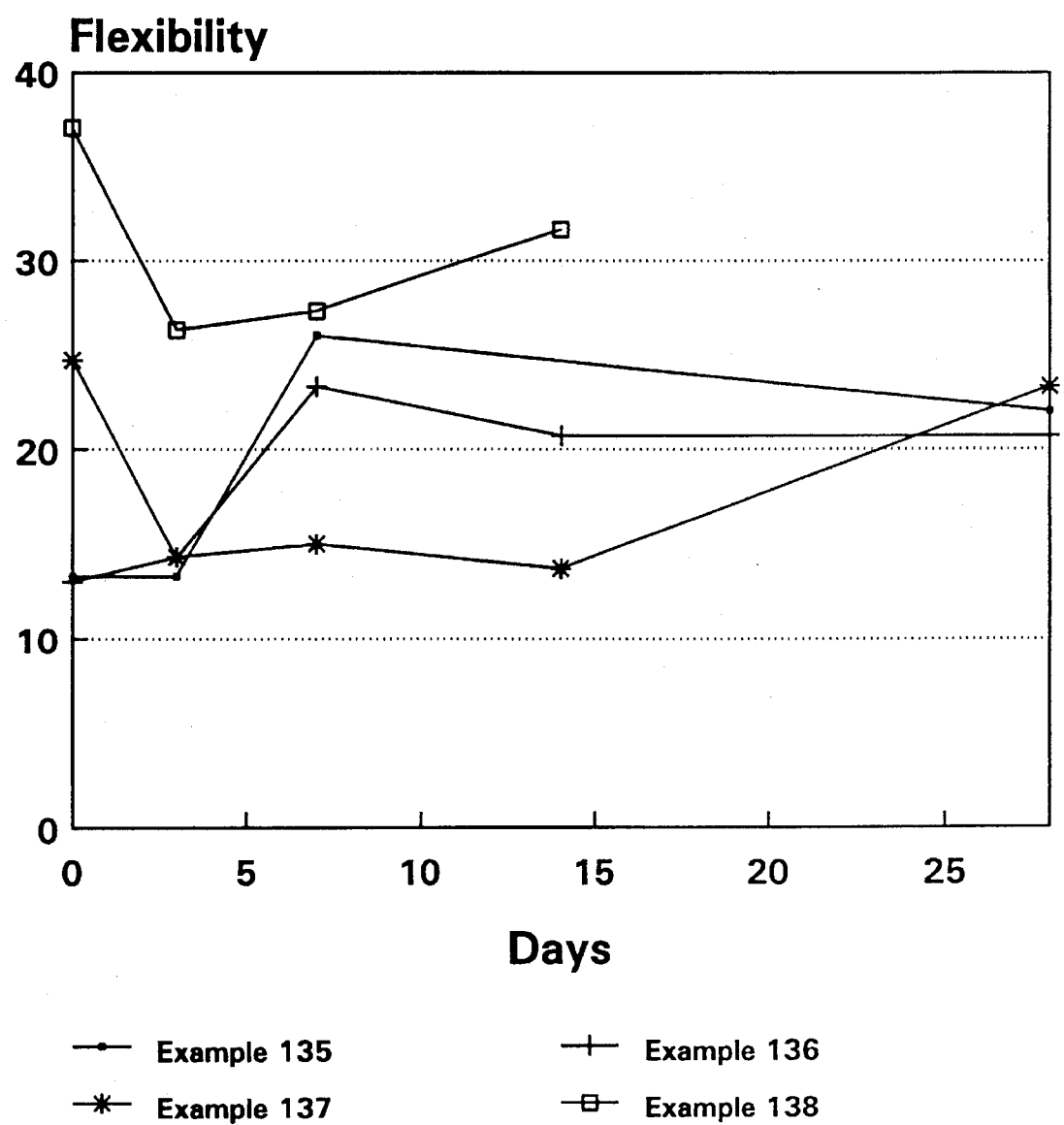
FIG. 5 shows the flexibility of low moisture gum containing indigestible dextrin.

For low moisture gum, results in FIG. 4 indicate that the addition of as low as 5% indigestible dextrin improves softness of sugarless gum and keeps it soft in an accelerated shelf life test. Sensory tests also show that levels as low as 5% indigestible dextrin give gum more cohesion, which improves handling properties during sheeting and wrapping. FIG. 5 demonstrates that all the samples remain flexible in the accelerated shelf life test.

Figure 6:
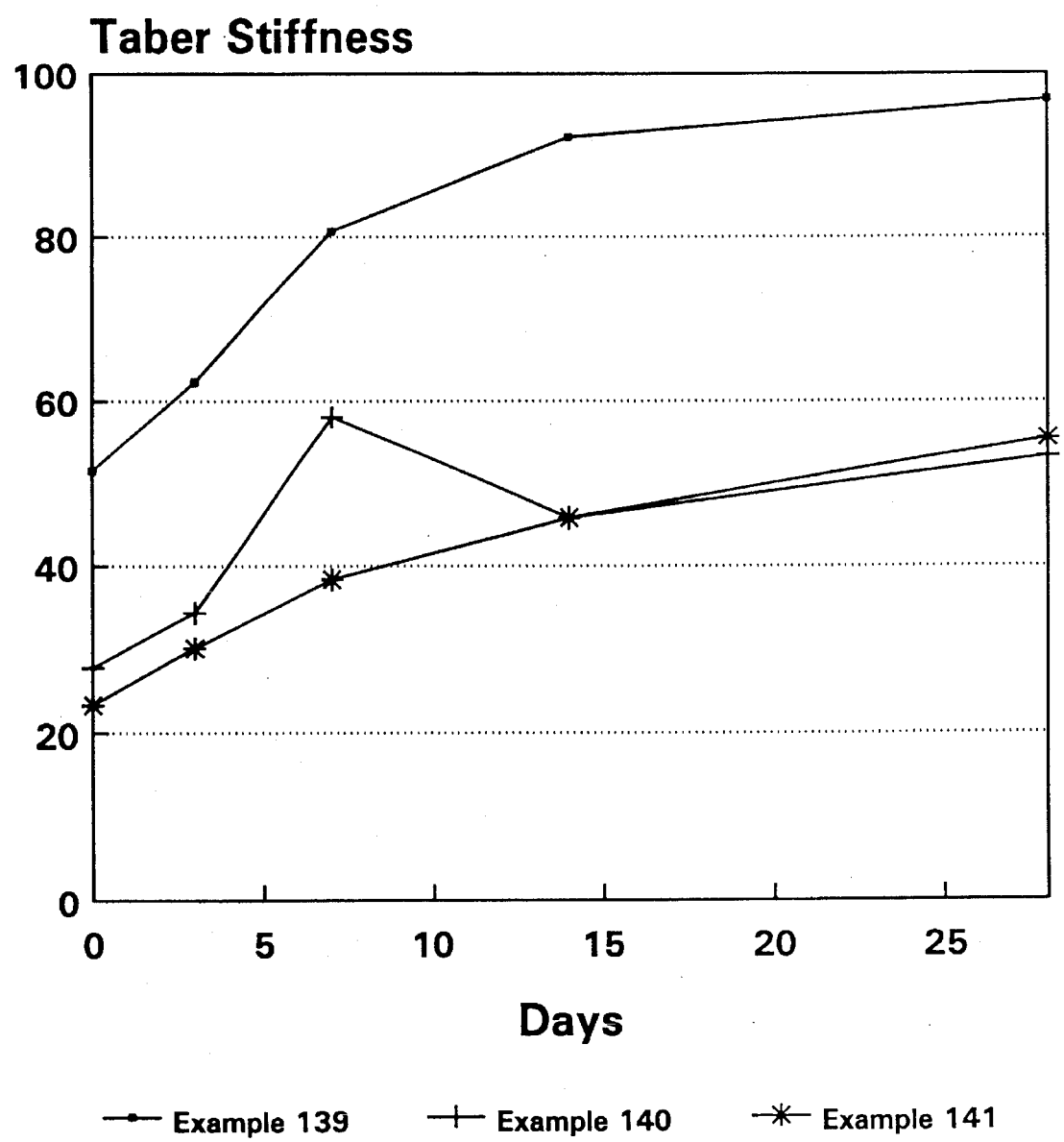
FIG. 6 shows the Taber stiffness of high moisture gum containing indigestible dextrin.
Figure 7:
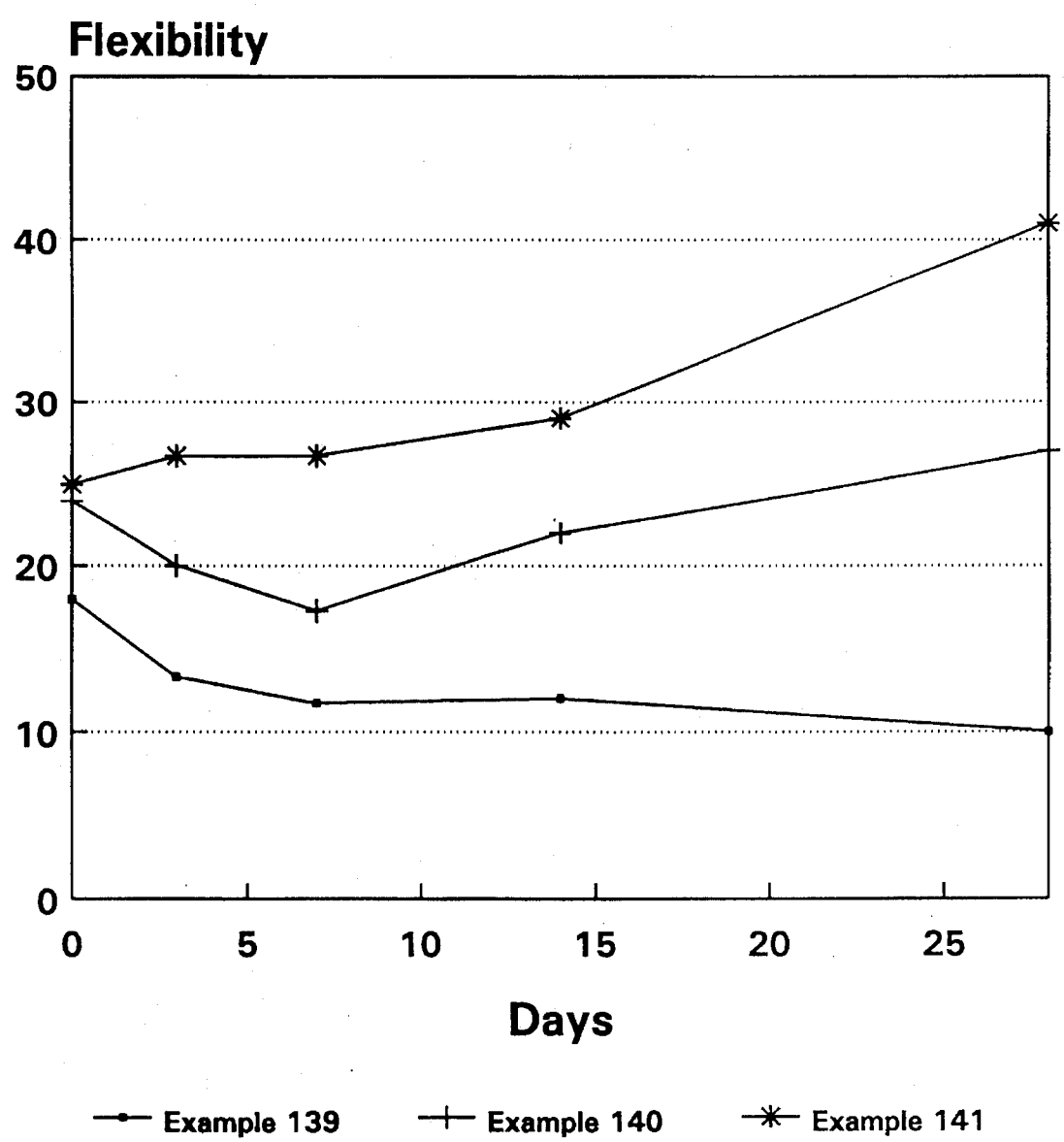
FIG. 7 shows the flexibility of high moisture gum containing indigestible dextrin.

For high moisture gum, results in FIGS. 6 and 7 indicate gum with as low as 5% indigestible dextrin softens the gum initially and keeps it soft throughout the accelerated shelf life tests. Flexibility of the gum also remains high, even with low usage levels of indigestible dextrin.

EXAMPLES 143–144

Fibersol 2 was used to prepare a 78% solids syrup solution by mixing 2994 grams of Fibersol 2 with 844 grams of near boiling water using a mechanical stirrer. This syrup was used to prepare the following two gum formulations:

|  | Ex 143 | Ex 144 |
|---|---|---|
| BASE | 24.4 | 24.4 |
| FIBERSOL 2 SYRUP | 25.0 | 25.0 |
| FIBERSOL 2 POWDER | 46.7 | 41.7 |
| GLYCERIN | 2.0 | 7.0 |
| LECITHIN | 0.15 | 0.15 |
| APM | 0.2 | 0.2 |
| 10% SALT SOLUTION | 0.05 | 0.05 |
| PEPPERMINT FLAVOR | 1.5 | 1.5 |

EXAMPLES 145-152

Eight gums were made that contained indigestible dextrin, in various forms, as the only bulking agent, according to the following formulations:

|  | EX. 145 | EX. 146 | EX. 147 | EX. 148 | EX. 149 | EX. 150 | EX. 151 | EX. 152 |
|---|---|---|---|---|---|---|---|---|
| BASE | 26.4 | 26.4 | 26.4 | 26.4 | 26.4 | 27.0 | 27.0 | 24.6 |
| FIBERSOL G | 54.3 | 49.3 | 39.3 | — | 35.9 | 60.7 | 58.7 | — |
| FIBERSOL 2 POWDER | — | — | — | 33.4 | — | — | — | 56.2 |
| FIBERSOL 2 SYRUP | 15.0 | 20.0 | 30.0 | 29.8 | 27.3 | — | — | — |
| GLYCERIN | 2.0 | 2.0 | 2.0 | 8.1 | 8.1 | 10.0 | 12.0 | 17.0 |
| APM | 0.5 | 0.5 | 0.5 | 0.5 | 0.5 | 0.5 | 0.5 | 0.5 |
| SPEARMINT FLAVOR | 1.7 | 1.7 | 1.7 | 1.7 | 1.7 | 1.7 | 1.7 | — |
| COLOR | 0.1 | 0.1 | 0.1 | 0.1 | 0.1 | 0.1 | 0.1 | — |
| PEPPERMINT FLAVOR | — | — | — | — | — | — | — | 1.5 |
| LECITHIN | — | — | — | — | — | — | — | 0.2 |

EXAMPLES 153-167 (Tables 13-15)

These examples demonstrate how Fibersol G may be used in a variety of chewing gum formulations at various levels. Table 13 shows a low moisture sugar-free gum. Table 14 shows a higher moisture sugarless gum. Table 15 shows a more typical gum formula with HSH syrup.

TABLE 13

|  | EX. 153 | EX. 154 | EX. 155 | EX. 156 | EX. 157 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| MANNITOL | 12.0 | 12.0 | 12.0 | 12.0 | 12.0 |
| GLYCERIN | 10.0 | 10.0 | 10.0 | 10.0 | 11.0 |
| FLAVOR | 1.5 | 1.5 | 1.5 | 1.5 | 1.5 |
| FIBERSOL G | 1.0 | 5.0 | 10.0 | 25.0 | 50.0 |

TABLE 14

|  | EX. 158 | EX. 159 | EX. 160 | EX. 161 | EX. 162 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| LIQUID SORBITOL* | 10.0 | 10.0 | 10.0 | 10.0 | 11.0 |
| MANNITOL | 10.0 | 10.0 | 10.0 | 10.0 | 10.0 |
| GLYCERIN | 2.0 | 2.0 | 2.0 | 2.0 | 2.0 |
| FLAVOR | 1.5 | 1.5 | 1.5 | 1.5 | 1.5 |
| FIBERSOL G | 1.0 | 5.0 | 10.0 | 25.0 | 50.0 |

*Sorbitol liquid contains 70% sorbitol, 30% water

TABLE 15

|  | EX. 163 | EX. 164 | EX. 165 | EX. 166 | EX. 167 |
|---|---|---|---|---|---|
| BASE | 25.5 | 25.5 | 25.5 | 25.5 | 25.5 |
| SORBITOL | 50.0 | 46.0 | 41.0 | 26.0 | 0.0 |
| HSH SYRUP* | 10.0 | 10.0 | 10.0 | 10.0 | 10.0 |
| MANNITOL | 8.0 | 8.0 | 8.0 | 8.0 | 9.0 |
| GLYCERIN** | 4.0 | 4.0 | 4.0 | 4.0 | 4.0 |
| FLAVOR | 1.5 | 1.5 | 1.5 | 1.5 | 1.5 |

TABLE 15-continued

|  | EX. 163 | EX. 164 | EX. 165 | EX. 166 | EX. 167 |
|---|---|---|---|---|---|
| FIBERSOL G | 1.0 | 5.0 | 10.0 | 25.0 | 50.0 |

*Lycasin brand hydrogenated starch hydrolysate syrup
**Glycerin and HSH syrup may be blended or co-evaporated

EXAMPLES 167-178 (Table 16)

These examples show how Fibersol G may be used with polyols in various sugar-free gum formulations.

TABLE 16

|  | EX. 167 | EX. 168 | EX. 169 | EX. 170 | EX. 171 | EX. 172 |
|---|---|---|---|---|---|---|
| BASE | 25.5 | 25.5 | 25.5 | 25.5 | 25.5 | 25.5 |
| GLYCERIN | 2.0 | 2.0 | 2.0 | 2.0 | 2.0 | 2.0 |
| SORBITOL | 44.0 | 34.0 | 34.0 | 29.0 | 28.0 | — |
| MANNITOL | — | 10.0 | 10.0 | 10.0 | 10.0 | 6.0 |
| SORBITOL LIQUID | 17.0 | 17.0 | — | — | — | — |
| LYCASIN HSH SYRUP | — | — | 17.0 | 12.0 | 8.0 | 10.0 |
| MALTITOL | — | — | — | 10.0 | — | — |
| XYLITOL | — | — | — | — | 15.0 | 15.0 |
| LACTITOL | — | — | — | — | — | — |
| PALATINIT | — | — | — | — | — | — |
| FLAVOR | 1.5 | 1.5 | 1.5 | 1.5 | 1.5 | 1.5 |
| FIBERSOL G | 10.0 | 10.0 | 10.0 | 10.0 | 10.0 | 40.0 |

|  | EX. 173 | EX. 174 | EX. 175 | EX. 176 | EX. 177 | EX. 178 |
|---|---|---|---|---|---|---|
| BASE | 25.5 | 25.5 | 25.5 | 25.5 | 25.5 | 25.5 |
| GLYCERIN | 8.0 | 8.0 | 8.0 | 2.0 | 3.0 | 2.0 |
| SORBITOL | 32.0 | 27.0 | 22.0 | 31.0 | 10.0 | — |
| MANNITOL | 8.0 | 8.0 | 8.0 | — | — | — |
| SORBITOL LIQUID | 5.0 | — | — | — | — | — |
| LYCASIN HSH SYRUP | — | 5.0 | 5.0 | 5.0 | 10.0 | 10.0 |
| MALTITOL | — | 5.0 | — | — | — | — |
| XYLITOL | — | — | — | 15.0 | — | — |
| LACTITOL | 10.0 | 10.0 | 10.0 | — | — | — |
| PALATINIT | — | — | 10.0 | 10.0 | 25.0 | 21.0 |
| FLAVOR | 1.5 | 1.5 | 1.5 | 1.5 | 1.5 | 1.5 |
| FIBERSOL G | 10.0 | 10.0 | 10.0 | 10.0 | 25.0 | 40.0 |

EXAMPLES 179-189 (Table 17 and 18)

These examples show how Fibersol G powder and a 75% solids Fibersol G syrup can be used together to obtain non-cariogenic, low calorie gum formulations that do not contain any other carbohydrates and polyols.

TABLE 17

|  | EX. 179 | EX. 180 | EX. 181 | EX. 182 | EX. 183 |
|---|---|---|---|---|---|
| GUM BASE | 19.2 | 25.5 | 25.5 | 25.5 | 40.0 |
| GLYCERIN | 2.0 | 2.0 | 7.0 | 7.0 | 2.0 |
| FIBERSOL G POWDER | 57.8 | 46.0 | 41.0 | 51.0 | 35.5 |
| FIBERSOL G SYRUP* | 20.0 | 25.0 | 25.0 | 15.0 | 20.0 |
| FLAVOR | 1.0 | 1.5 | 1.5 | 1.5 | 2.5 |

*Fibersol syrup at 75% solids may also be preblended with glycerin and co-evaporated to reduce moisture.

TABLE 18

|  | EX. 184 | EX. 185 | EX. 186 | EX. 187 | EX. 188 | EX. 189 |
| --- | --- | --- | --- | --- | --- | --- |
| GUM BASE | 25.5 | 25.5 | 25.5 | 25.5 | 50.0 | 70.0 |
| GLYCERIN | 2.0 | 2.0 | 7.0 | 15.0 | 2.0 | 1.0 |
| FIBERSOL G POWDER | 51.0 | 61.0 | 46.0 | 48.0 | 35.5 | 20.0 |
| FIBERSOL G SYRUP* | 20.0 | 10.0 | 20.0 | 10.0 | 10.0 | 6.0 |
| FLAVOR | 1.5 | 1.5 | 1.5 | 1.5 | 2.5 | 3.0 |

*Fibersol syrup at 75% solids may also be preblended with glycerin and co-evaporated to reduce moisture.

The formulations in all the above tables may also contain high intensity artificial sweeteners from about 0.02% to about 0.1% for sweeteners like alitame, thaumatin, and dihydrochalcone, and from about 0.1% to about 0.4% for sweeteners like aspartame, sucralose, acesulfame and saccharin.

EXAMPLES 190 to 192

Fibersol G may be used in a sugarless, noncariogenic hard candy either in a powder form or a syrup form as shown in the following formulas.

|  | % |
| --- | --- |
| Example 190 (fruit flavored hard candy) | |
| Xylitol Gum | 15.8 |
| Fibersol G powder | 34.8 |
| Fibersol G syrup (75% solids) | 38.0 |
| Water | 11.0 |
| Citric Acid | 0.3 |
| Artificial sweetener/fruit flavor/color | as needed |
| Example 191 (butterscotch hard candy) | |
| Fibersol G powder | 53.6 |
| Sorbitol | 26.4 |
| Water | 17.66 |
| Butter | 2.06 |
| Salt | 0.12 |
| Natural and artificial flavor | 0.16 |
| Example 192 (hard candy) | |
| Fibersol G powder | 80.0 |
| Maltitol syrup (75% solids) | 10.0 |
| Xylitol | 9.35 |
| Aspartame | 0.35 |
| Salt | 0.12 |
| Citric acid/flavor/color | as needed |

Procedure: Hard candies are made by the following procedure:

1) In a stainless steel, steam jacketed kettle, mix Fibersol G powder, syrup, xylitol, water, sorbitol, salt and heat to form a thick syrup.
2) Continue to cook and mix until a temperature of about 300° F. and a moisture level of about 1–2% is obtained.
3) Pour heavy syrup onto stainless steel cooling table.
4) Add citric acid, artificial ingredients, flavors and color, butter, and mix by kneading.
5) Allow to cool to room temperature and cut as needed.

Example 193 (candy compressed tablet-breath mints)

Fibersol may be used in a sugarless pressed tablet with the following formula and procedure:

|  | % |
| --- | --- |
| Sorbitol | 49.9 |
| Fibersol G powder | 48.9 |
| Aspartame | 0.1 |
| Magnesium stearate | 1.0 |
| Peppermint flavor | 0.1 |

Procedure:

1) Weigh ingredients into suitable containers.
2) Place sorbitol and Fibersol G powder in a mixer bowl and add flavor and sweetener.
3) Mix for 3 minutes.
4) Add magnesium stearate and mix three minutes.
5) Start tableting and adjust size, weight, and hardness.

Example 194 (sugarless taffy)

Fibersol G may be used to prepare a sugar-free taffy by the following formula and procedure: Formula:

|  | % As Is | % DSB | 20# (9.072 Kg) Batch |
| --- | --- | --- | --- |
| Fibersol G syrup | 94.5 | 92.7 | 18.9 (8.573 Kg) |
| 110° F. M.P. vegetable oil | 5.25 | 7.0 | 1.05 (0.476 Kg) |
| Lecithin | 0.25 | 0.3 | 0.3 (0.136 Kg) |
| Flavor/color/acid/sweetener | As needed | | |

Procedure:

1. Weigh Fibersol G syrup into an atmospheric cooker, such as a Savage open fire cooker, and cook to about 255° F. (123.9° C.). No agitation is required for this step.
2. Let cooked Fibersol G syrup cool to about 230° F. and add fat and lecithin; fat does not have to be premelted. Mix until uniform.
3. Pour mass on oiled cooling table. Side bars may be necessary for initial cooling if table is small.
4. Work in color, flavor and acid on the slab before pulling (color and flavor may also be added on puller). Cool to plastic texture.
5. Pull cooked mass until desired texture is attained. Cut and wrap in moisture resistant packaging.

Example 195 (sugar-free caramel)

Fibersol G may be used to prepare a sugar-free caramel by the following formula and procedure:

| Fibersol G syrup (75% solids) | 58.53% |
| --- | --- |
| Evaporated milk | 33.24 |
| Coconut oil, 92° F. (33° C.) | 7.68 |
| Lecithin | 0.20 |
| Salt | 0.20 |
| Aspartame | 0.11 |

-continued

| | | |
|---|---|---|
| Vanillin | | 0.04 |
| | Total | 100.00% |

Procedure:

1. Prepare aspartame slurry by mixing ⅓ ratio of aspartame to coconut oil in a high shear blender for about 30 seconds.
2. Premix all ingredients, except aspartame slurry, half of the evaporated milk and the vanillin, for 5 minutes at about 120° F. (48.9° C.).
3. Bring premix to a boil and slowly add the balance of the evaporated milk, maintaining the boil.
4. Cook to the desired texture. Final cook temperature will vary according to the cooking process. A suggested final cook temperature is about 245° F. (118.3° C.).
5. Cool the caramel to about 220° F. (104° C.) and add the aspartame slurry slowly with mixing. Methyl vanillin should also be added at this time.
6. Slab, cut and wrap as desired.

Example 196 (sugarless gum drops)

| | % |
|---|---|
| Gelatin 200 bloom type B | 7.0 |
| Crystalline sorbitol | 34.9 |
| Fibersol G syrup (75% solids) | 32.6 |
| Hot Water (80–90° C.) | 14.0 |
| Water | 10.0 |
| Citric acid solution | 1.5 |
| Fruit flavor/color | as needed |

Procedure:

1) Dissolve gelatin directly in hot water.
2) Cook the Fibersol G syrup, sorbitol and water at 115° C., and add gelatin solution.
3) Stir slowly in order to obtain a smooth homogenous mixture.
4) Remove air bubbles with deaeration equipment or other available means.
5) Add citric acid solution, flavor and color.
6) Deposit in cool and dry starch, and sprinkle a little starch onto the articles. Temperature: 70° C. Total solids when depositing: 78° C. Brix.
7) store the starch tray at room temperature for 24 hours.
8) After removal from the molding starch, oil the articles or sand with mannitol.

Other food items in which Fibersol G may be used as a non-cariogenic bulking agent are:

1) Confections and frostings.
2) Dressings for salads.
3) Frozen dairy deserts and mixes.
4) Gelatins, puddings and fillings.
5) Hard candy.
6) Soft candy.
7) Baked goods and baking mixes.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

We claim:

1. A chewing gum composition comprising about 5% to about 95% gum base, about 0.1% to about 10% of a flavoring agent, about 5% to about 90% bulking agent and sweetness imparting amounts of unencapsulated aspartame wherein the bulking agent includes an effective amount of indigestible dextrin to stabilize said aspartame against decomposition during storage in a sealed pouch at 85° F. for eight weeks whereby at least 10% less aspartame decomposes into non-sweetening derivatives than would have decomposed if the indigestible dextrin were not included in the gum composition.

2. The chewing gum composition of claim 1 wherein the gum composition comprises at least 10% indigestible dextrin.

3. The chewing gum composition of claim 1 wherein the gum composition comprises about 0.005% to about 1% unencapsulated aspartame.

4. The chewing gum composition of claim 1 wherein the indigestible dextrin is effective such that after eight weeks of storage at 85° F., over 80% of the unencapsulated aspartame originally formulated in the gum composition remains undecomposed.

5. The chewing gum composition of claim 1 wherein the indigestible dextrin is in the form of an enzyme treated pyrodextrin derived from corn starch or potato starch and mixtures thereof.

6. The chewing gum composition of claim 1 wherein the indigestible dextrin is in the form of an aqueous syrup.

7. A chewing gum composition comprising about 5% to about 95% gum base, about 0.1% to about 10% of a flavoring agent, about 5% to about 90% bulking agent and a high-intensity sweetener encapsulated with indigestible dextrin.

8. The chewing gum composition of claim 7 wherein the indigestible dextrin is in the form of an enzyme treated pyrodextrin derived from corn starch or potato starch and mixtures thereof.

9. A chewing gum product comprising about 5% to about 95% gum base, about 0.1% to about 10% of a flavoring agent, about 5% to about 90% bulking agent and having a rolling compound thereon, the rolling compound comprising indigestible dextrin.

10. The chewing gum product of claim 9 wherein the indigestible dextrin comprises from about 0.5% to 100% of the rolling compound.

11. The chewing gum product of claim 9 wherein the indigestible dextrin comprises from about 0.005% to about 5% of the chewing gum product.

12. The chewing gum product of claim 9 wherein the indigestible dextrin is in the form of an enzyme treated pyrodextrin derived from corn starch or potato starch and mixtures thereof.

13. A coated chewing gum product comprising a gum pellet comprising about 5% to about 95% gum base, about 0.1% to about 10% of a flavoring agent and about 5% to about 90% bulking agent, the gum pellet being coated with a coating comprising indigestible dextrin.

14. The coated chewing gum product of claim 13 wherein the indigestible dextrin comprises about 0.1% to about 20% of the coating.

15. The coated chewing gum product of claim 13 wherein the coating comprises a hard shell coating.

16. The chewing gum product of claim 13 wherein the indigestible dextrin is in the form of an enzyme treated pyrodextrin derived from corn starch or potato starch and mixtures thereof.

17. A chewing gum product comprising about 5% to about 95% gum base, about 0.1% to about 10% of a flavoring agent, about 5% to about 90% bulking agent and having a liquid center wherein the liquid center comprises indigestible dextrin.

18. The chewing gum product of claim 17 wherein the indigestible dextrin is in the form of an enzyme treated pyrodextrin derived from corn starch or potato starch and mixtures thereof.

19. A method of making a coated chewing gum product comprising the steps of:
   a) providing a gum pellet comprising about 5% to about 95% gum base, about 0.1% to about 10% of a flavoring agent and about 5% to about 90% bulking agent;
   b) applying a liquid coating syrup to the surface of the gum pellet, the coating syrup comprising indigestible dextrin, and
   c) solidifying the coating syrup.

20. The method of claim 19 wherein the coating syrup comprises a solution and the step of solidifying the coating comprises drying the solution.

21. The method of claim 19 wherein the coating syrup is applied in successive layers, with each layer of syrup being dried before application of an additional layer.

22. The method of claim 21 wherein a powdered coating is applied after one or more of the syrup layers is applied.

23. The method of claim 22 wherein the powdered coating comprises indigestible dextrin, maltodextrin, gelatin, cellulose derivative, starch, modified starch, vegetable gum, filler or mixtures thereof.

24. The method of claim 19 wherein the indigestible dextrin is in the form of an enzyme treated pyrodextrin derived from corn starch or potato starch and mixtures thereof.

25. The method of claim 19 wherein the product is non-cariogenic.

26. The method of claim 19 wherein the product is free of polyols.

27. A method of making chewing gum comprising the steps of:

a) co-drying a solution containing indigestible dextrin and another sweetener selected from the group consisting of sugar sweeteners, alditol sweeteners and high-potency sweeteners, the co-dried indigestible dextrin sweetener thus forming a bulking agent; and b) mixing the co-dried, indigestible dextrin sweetener with about 5% to about 95% gum base, about 0.1% to about 10% flavoring agents and sufficient additional bulking agents such that the bulking agents comprise about 5% to about 90% of the gum, to produce a gum composition.

28. The method of claim 27 wherein the indigestible dextrin is in the form of an enzyme treated pyrodextrin derived from corn starch or potato starch and mixtures thereof.

29. A method of making chewing gum comprising the steps of:
   a) co-evaporating an aqueous solution comprising indigestible dextrin and a plasticizing agent to form a syrup, and
   b) mixing the syrup with about 5% to about 95% gum base, about 5% to about 90% bulking agents and about 0.1% to about 10% flavoring agents to produce a gum composition.

30. The method of claim 29 wherein the plasticizing agent is selected from the group consisting of glycerin, propylene glycol and mixtures thereof.

31. The method of claim 29 wherein the indigestible dextrin is in the form of an enzyme treated pyrodextrin derived from corn starch or potato starch and mixtures thereof.

32. A chewing gum composition comprising about 5% to about 95% gum base, about 0.1% to about 10% of a flavoring agent and about 5% to about 90% bulking agent wherein the flavoring agent comprises a flavor encapsulated with indigestible dextrin.

33. The chewing gum composition of claim 32 wherein the indigestible dextrin is in the form of an enzyme treated pyrodextrin derived from corn starch or potato starch and mixtures thereof.

34. A chewing gum composition comprising:
   a) about 5% to about 95% gum base;
   b) about 0.1% to about 10% of a flavoring agent;
   c) about 5% to about 90% bulking agent, the bulking agent comprising at least in part indigestible dextrin; and
   d) sweetening amounts of aspartame.

* * * * *

UNITED STATES PATENT AND TRADEMARK OFFICE
CERTIFICATE OF CORRECTION

PATENT NO. : 5,458,892
DATED : October 17, 1995
INVENTOR(S) : Yatka et al.

Page 1 of 3

It is certified that error appears in the above-indentified patent and that said Letters Patent is hereby corrected as shown below:

<u>On the Title Page</u>

In column 1, Item [63] line 2, after "5,236,719" and before the period ("."), add the following:

--, and continuation-in-part of PCT/US91/07127, Sept. 27, 1991, abandoned--.

In column 1, line 13, replace "continuation-of-part" with --continuation-in-part--.

In column 1, line 30, replace "Other" with --other--.

In column 3, line 42, replace "USA" with --US--.

In column 4, line 54, replace "sucrose-to" with --sucrose to--.

In column 5, line 2, replace "comestible" with --comestibles--.

In column 10, line 67, under "EXAMPLE 1", after "the" insert --gum.--.

UNITED STATES PATENT AND TRADEMARK OFFICE
CERTIFICATE OF CORRECTION

PATENT NO. : 5,458,892
DATED : October 17, 1995
INVENTOR(S) : Yatka et al.

It is certified that error appears in the above-indentified patent and that said Letters Patent is hereby corrected as shown below:

In column 12, line 12, replace "demonstrates" with --demonstrate--.

In column 17, line 38, replace "8 9" with --8, 9--.

In column 17, line 40, replace "highintensity" with --high-intensity--.

In column 17, line 53, replace "highintensity" with --high-intensity--.

In column 19, line 25, replace "formulation" with --formulations--, and "Table" with --Tables--.

In column 22, line 21, replace "gums" with --gum's--.

In column 24, line 2 of "TABLE 16" delete "167" on the far left side of the column, replace "168 169 170 171 172" with --167 168 169 170 171--, and at the end of the line insert --172--.

In column 24, line 7 of "TABLE 16" in the last column insert a dash ("-").

UNITED STATES PATENT AND TRADEMARK OFFICE
CERTIFICATE OF CORRECTION

PATENT NO. : 5,458,892
DATED : October 17, 1995
INVENTOR(S) : Yatka et al.

It is certified that error appears in the above-indentified patent and that said Letters Patent is hereby corrected as shown below:

In column 24, line 18 of "TABLE 16" delete "173" on the far left side of the column, replace "174  175  176  177  178" with --173  174  175  176  177--, and at the end of the line insert --178--.

In column 27, line 52, replace "store" with --Store--.

In column 27, line 60, replace "deserts" with --desserts--.

Signed and Sealed this

Twenty-first Day of March, 2000

Attest:

Attesting Officer

Q. TODD DICKINSON

Commissioner of Patents and Trademarks